(12) United States Patent
Suzuki et al.

(10) Patent No.: US 11,772,166 B2
(45) Date of Patent: Oct. 3, 2023

(54) CUTTING INSERT

(71) Applicant: TUNGALOY CORPORATION, Fukushima (JP)

(72) Inventors: Yusuke Suzuki, Iwaki (JP); Yasutake Sasaki, Iwaki (JP)

(73) Assignee: TUNGALOY CORPORATION, Fukushima (JP)

(*) Notice: Subject to any disclaimer, the term of this patent is extended or adjusted under 35 U.S.C. 154(b) by 51 days.

(21) Appl. No.: 17/643,209

(22) Filed: Dec. 8, 2021

(65) Prior Publication Data

US 2022/0274185 A1 Sep. 1, 2022

(30) Foreign Application Priority Data

Feb. 26, 2021 (JP) ................. 2021-029408

(51) Int. Cl.
*B23B 27/16* (2006.01)
*B23B 27/22* (2006.01)

(52) U.S. Cl.
CPC ............. *B23B 27/16* (2013.01); *B23B 27/22* (2013.01); *B23B 2200/081* (2013.01); *B23B 2240/08* (2013.01)

(58) Field of Classification Search
CPC ............ B23B 27/16; B23B 2200/0423; B23B 2200/081; B23B 2200/085; B23B 2200/087; B23B 27/14; B23B 27/045; B23B 2200/369; B23B 2226/125; B23B 2226/31; B23B 2228/04; B23B 2228/08; B23B 2240/08; B23B 27/141; B23B 27/00; B23B 27/22
See application file for complete search history.

(56) References Cited

U.S. PATENT DOCUMENTS 4,629,372 A * 12/1986 Huston ................... B23B 27/08
407/116
4,880,338 A 11/1989 Stashko
(Continued)

FOREIGN PATENT DOCUMENTS

EP 3 381 595 A1 10/2018
JP H02-284805 A 11/1990
(Continued)

*Primary Examiner* — Sara Addisu
(74) *Attorney, Agent, or Firm* — Studebaker & Brackett PC

(57) ABSTRACT

Chip discharge during high-feed machining and low-feed machining particularly in a high-depth-of-cut state or the like is improved so as to allow so-called freedom of feed during cutting to be improved. A cutting edge body of a cutting insert includes a front cutting edge formed on one end side in a longitudinal direction, the front cutting edge being a cutting edge formed on an intersecting edge between a peripheral side surface and an upper surface of the cutting edge body having a prismatic shape, a side cutting edge formed on one end side in a lateral direction, a recessed part provided in the upper surface of the cutting edge body to be subsequent to the side cutting edge in the lateral direction, and a wall part having a wavy wall surface formed in a portion of the recessed part and a discrete wall surface formed at a position between the wavy wall surface and the side cutting edge and including a plurality of surfaces which are discrete along the longitudinal direction.

17 Claims, 26 Drawing Sheets

(56) References Cited

U.S. PATENT DOCUMENTS

| | | | |
|---|---|---|---|
| 4,969,779 A | 11/1990 | Barten | |
| 5,676,495 A * | 10/1997 | Katbi | B23B 27/045 407/115 |
| 6,986,626 B2 * | 1/2006 | Gati | B23B 27/045 407/113 |
| 7,665,933 B2 * | 2/2010 | Nagaya | B23B 27/045 407/116 |
| 9,108,248 B2 * | 8/2015 | Fujii | B23B 27/045 |
| 10,286,455 B2 * | 5/2019 | Tomoda | B23B 27/20 |
| 2012/0051854 A1 | 3/2012 | Pretorius | |
| 2012/0170986 A1 | 7/2012 | Nam et al. | |
| 2016/0243624 A1 | 8/2016 | Tomoda et al. | |
| 2019/0143419 A1 | 5/2019 | Shimanuki et al. | |
| 2022/0274184 A1 * | 9/2022 | Suzuki | B23B 27/045 |
| 2022/0410277 A1 * | 12/2022 | Suzuki | B23B 27/145 |

FOREIGN PATENT DOCUMENTS

| | | | |
|---|---|---|---|
| JP | 4829197 B2 | | 12/2011 |
| JP | 2012-525987 A | | 10/2012 |
| JP | 2017193001 A | * | 10/2017 |
| JP | 2017-196693 A | | 11/2017 |
| WO | 2014/021227 A1 | | 2/2014 |
| WO | 2016/035490 A1 | | 3/2016 |
| WO | 2018/159499 A1 | | 9/2018 |

* cited by examiner

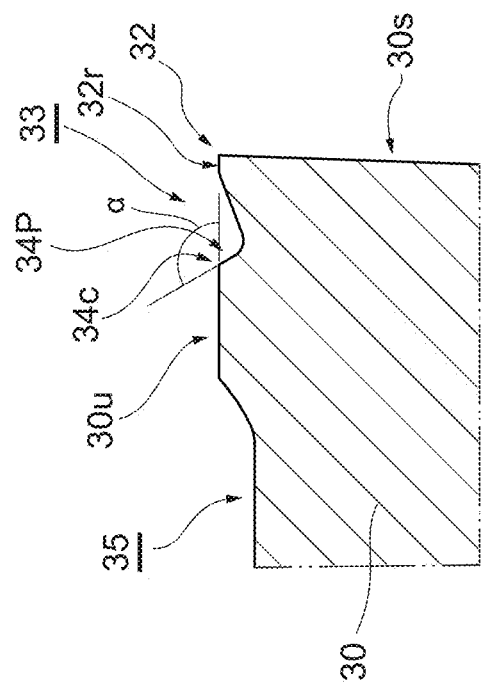
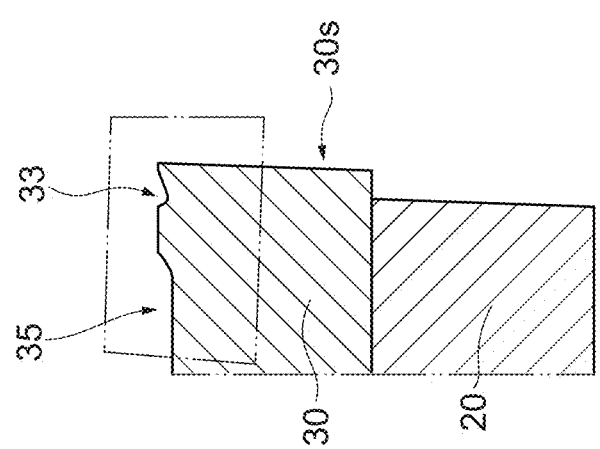
FIG. 13B
FIG. 13A

CUTTING INSERT

BACKGROUND

Field

The present invention relates to a cutting insert.

Description of Related Art

Conventionally, as tools for turning, various cutting inserts have been used and, with respect to such cutting inserts, a technology (see, e.g., JP4829197B) related to a sintered body tool in which a cemented carbide chip breaker is left, a technology (see, e.g., JP2017-196693A) of adding a chip breaker to a sintered body, and the like are also proposed. In addition, a plan for improving chip control of an insert obtained by brazing a sintered body formed under an ultrahigh pressure to an ultrahard substrate has conventionally been proposed (see JP4829197B and JP2017-196693A).

SUMMARY

However, conventional cutting inserts still have various problems to be solved. It can be said that, in terms of chip discharge particularly when a feed speed of the cutting insert in a direction of a rotational axis of a workpiece is set relatively high (during so-called high-feed operation) or when the feed speed of the cutting insert is conversely set relatively low (during so-called low-feed operation), there is still room for further improvement and, in this regard, it can also be said that there are still some points to be improved in so-called freedom of feed of the cutting insert. The following are specific examples thereof.

For example, in JP4829197B, a projection for chip control is formed on a rake surface of a cutting tool main body so as to provide a brazed cutting tool having a simple shape and high chip control. However, a method of thus giving a chip breaker function to a projecting portion provided on an ultrahard substrate has a property such that a distance between a cutting point and the projecting portion depends on a size of a sintered body. Consequently, dimensions of the sintered body, a length of the cutting edge, and the like are limited. Therefore, it is difficult to improve the chip control during the low depth cutting (a state where the cutting edge of the insert that cuts into the workpiece is relatively short) or during the low-feed operation. In addition, in a cutting tool (brazed cutting tool) such as used in JP4829197B, the sintered body has a flat upper surface, and accordingly chips may not be able to be controlled during the low depth cutting or the low-feed operation.

As a solution to such a problem as described above, a technology of providing the upper surface of the sintered body with a recessed shape and thereby controlling chips under low-depth-of-cut and low-feed conditions, such as proposed in JP2017-196693A, can be proposed. JP2017-196693A also discloses an indented chip breaker as a modification, but the indented chip breaker is merely disposed in parallel to the side cutting edge. When consideration is given to profile machining (copy machining of cutting), high-depth-of-cut/low-feed machining is most important for a shape of an insert (chip corresponding to groove machining and lateral feed external shape machining) mainly for the profile machining. In these technologies described in JP4829197B and JP2017-196693A, chip control during so-called one-step finishing which includes no rough machining step is not sufficient while, in JP2017-196693A, adaptability particularly to low-feed machining (finishing) is insufficient, and it can be said that the technologies have problems in these respects.

It is therefore an object of the present invention to provide a cutting insert having improved chip discharge during high-feed machining or low-feed machining particularly in a high-depth-of-cut state or the like so as to allow so-called freedom of feed during cutting to be improved.

An aspect of the present invention is a cutting insert including a cutting edge body formed with a cutting edge. The cutting edge body has a prismatic shape having a longitudinal direction and a lateral direction perpendicular to the longitudinal direction and includes: a front cutting edge formed on one end side in the longitudinal direction, the front cutting edge being the cutting edge formed on an intersecting edge between a peripheral side surface and an upper surface of the cutting edge body having the prismatic shape; a side cutting edge formed on one end side in the lateral direction; a recessed part provided in the upper surface of the cutting edge body to be subsequent to the side cutting edge in the lateral direction; and a wall part having a wavy wall surface formed in a portion of the recessed part and a discrete wall surface formed at a position between the wavy wall surface and the side cutting edge and including a plurality of surfaces which are discrete along the longitudinal direction.

With the cutting insert according to an aspect as described above, freedom of feed during cutting may be improved by an operation carried out by the wall part including the wavy wall surface formed in the portion of the recessed part and the discrete wall surface. Specifically, in the present aspect focusing on a correlation between thicknesses of chips and a feeding condition, by using the correlation property, no deformation is given to thick chips when the cutting insert is fed at a relatively high speed along a direction of a rotational axis of a workpiece (during a high-feed operation) to prevent a chip jam, while a deformation is given to thin chips when the cutting insert is fed at a relative low speed along the direction of the rotational axis of the workpiece (during a low-feed operation) to control a direction in which the chips are deformed and allow the chips to be easily cut. More specifically, with the cutting insert according to the present aspect, during the high-feed operation, the discrete wall surface operates to lift up the chips from the workpiece (i.e., keep the chips away from the upper surface of the cutting edge body) and inhibit the chips from coming into contact with the wavy wall surface. Meanwhile, during the low-feed operation, the wavy wall surface causes an external force to be exerted on the chips from the workpiece to deform the chips and allow the chips to be easily cut. With the cutting insert according to the aspect described above, it is possible to improve chip discharge particularly during high-depth-of-cut/low-feed machining while, during, e.g., high-depth-of-cut/high-feed machining, a projecting shape of a substrate functions and, during low-depth-of-cut/low-feed machining, sufficient chip control of the recessed shape of the cutting edge body is maintained.

The following is a description of a principle of the cutting insert according to the present aspect, which is expected to improve chip discharge or the like as described above. First, a typical phenomenon during cutting (milling) is such that influence of different peripheral speeds at a workpiece is likely to become apparent during a low-feed operation while, when a high-feed operation is performed, a problem (influence) specific to the high-feed operation becomes apparent, and the influence of the different peripheral speeds at the workpiece during the low-feed operation is concealed thereby. With the cutting insert according to the present aspect which is configured in view of such a typical phenomenon, under a low-feed condition such as during lateral feed external shape machining, the wavy wall surface gives a deformation to cross sections of chips to allow the chips to be easily cut and, under a high-feed condition, the discrete wall surface lifts up chips to inhibit the chips from coming into contact with the wavy wall surface.

In the cutting insert described above, the front cutting edge and the side cutting edge may be connected via a corner cutting edge.

In the cutting insert described above, the front cutting edge may be formed perpendicular to the longitudinal direction of the cutting edge body, and the recessed part may be formed on each of one end side and another end side in the lateral direction to be asymmetric with respect to a virtual perpendicular plane perpendicular to the front cutting edge and halving the front cutting edge.

In the cutting insert described above, intervals at which the discrete wall surface is disposed may be set to be shorter with increasing distance from the front cutting edge along the longitudinal direction.

In the cutting insert described above, the wavy wall surface may be formed to have a size decreasing with increasing distance from the front cutting edge along the longitudinal direction.

In the cutting insert described above, each of the front cutting edge and the side cutting edge may be connected to a rake surface having a positive rake angle in a cross section perpendicular to each of the cutting edges.

In the cutting insert described above, each of the front cutting edge and the side cutting edge may be connected to the rake surface via a land part formed between each of the cutting edges and the rake surface.

In the cutting insert described above, the discrete wall surface may be provided as a wall surface forming an angle of not less than 90° with the upper surface in a virtual cross section corresponding to a plane perpendicular to the side cutting edge.

In the cutting insert described above, the wavy wall surface having a wavy periodic shape along the longitudinal direction and the discontinuous discrete wall surface may be configured to be connected in a top view of the cutting edge body.

In the cutting insert described above, a substrate to which the cutting edge body is to be joined may have a projected part projecting more toward the upper direction than the upper surface of the cutting edge body.

In the cutting insert described above, the projected part may be formed at a position distant by a predetermined value from a front surface of the substrate serving as one end thereof in the longitudinal direction.

In the cutting insert described above, the side cutting edge may be formed to extend to a position beyond the position distant by the predetermined value from the front surface.

In the cutting insert described above, the projected part may have an inclined surface which is inclined with respect to the side cutting edge in a top view.

In the cutting insert described above, the inclined surface may be formed to be closer to one end side in the lateral direction on which the side cutting edge is formed with increasing distance from the front surface.

In the cutting insert described above, the inclined surface may be formed at an angle of 60° to 80° with respect to the lateral direction in a top view.

In the cutting insert described above, the inclined surface may have an angle of 5° to 10° in a direction in which a distance to the front surface increases with increasing distance from the front surface.

In the cutting insert described above, the projected part may be formed in a shape so as to be connected to any one surface at which the cutting edge body and the substrate are in contact with each other.

In the cutting insert described above, the cutting edge body may be an ultrahigh-pressure sintered body to be joined to the substrate.

BRIEF DESCRIPTION OF DRAWINGS

FIG. 13A is a cross-sectional view along a line XIII-XIII in FIG. 7;

FIG. 13B is a diagram illustrating a frame portion in the cross-sectional view illustrated in FIG. 13A in enlarged relation;

DETAILED DESCRIPTION

Figure 1:
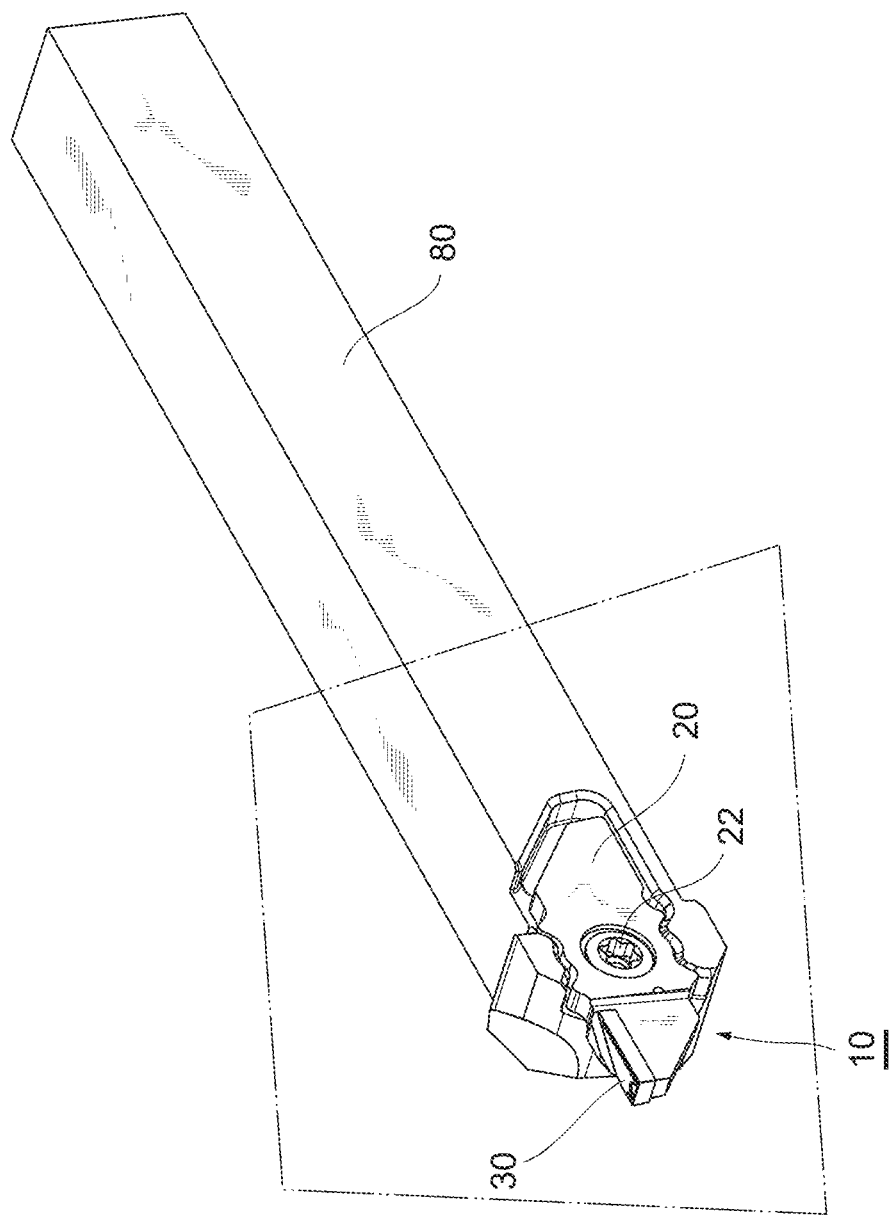
FIG. 1 is a perspective view illustrating an example of a cutting tool holder having a cutting insert in an aspect of the present invention mounted thereon.

Referring to the drawings, a detailed description will be given below of a preferred embodiment of a cutting tool according to the present invention (see FIG. 1 and the like).

A cutting insert 10 according to the present invention is configured as a cutting insert which is preferably used for turning using an automatic lathe tool such as a small lathe. The cutting insert 10 is formed by joining, to a substrate (base insert) 20, a cutting edge body 30 made of an ultra-high-pressure sintered body having a hardness higher than that of the substrate 20 by brazing. The cutting insert 10 having such a configuration has an extremely high abrasion resistance, and accordingly can be used to cut various metal materials such as cast iron, a high-hardness metal material, and a non-ferrous alloy of aluminum or the like (see FIGS. 1 and 2 and the like). The cutting insert 10 in the present embodiment is mounted on a cutting tool holder 80, fed in a grooving direction during groove machining, and fed in a lateral feed direction during lateral feed machining to be used to cut a work (workpiece) 100 (see FIGS. 24 and 25).

Cutting Edge Body

Figure 3:
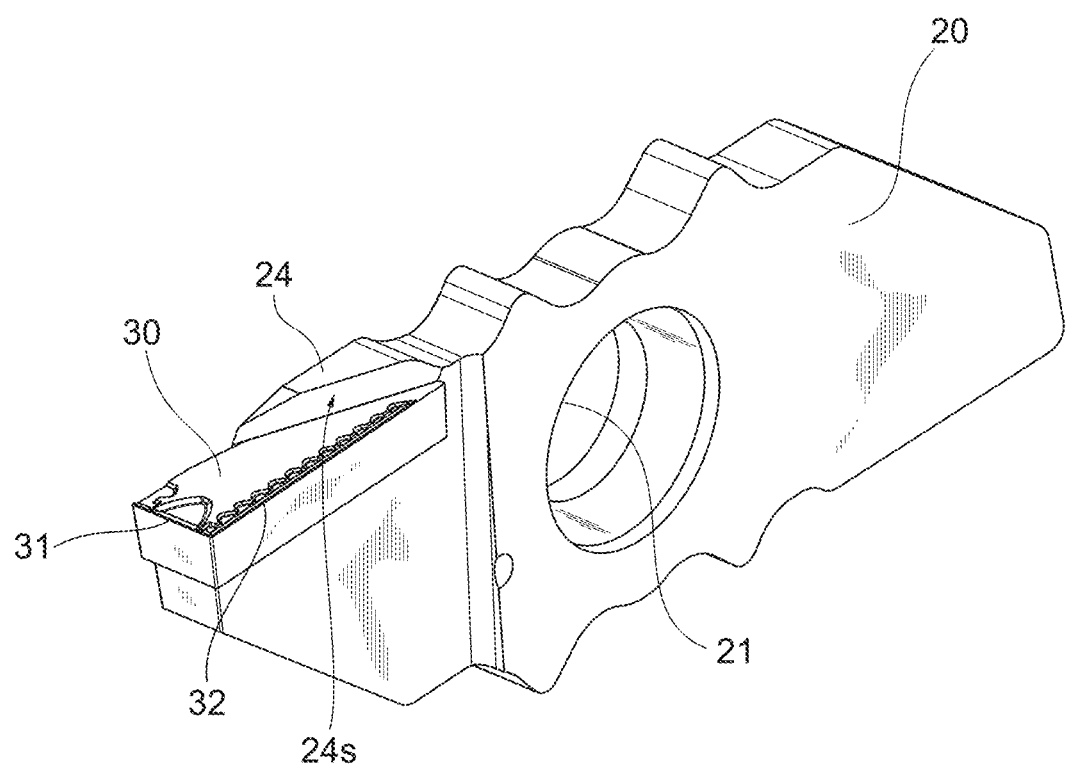
FIG. 3 is a perspective view illustrating an example of the cutting insert.
Figure 4:
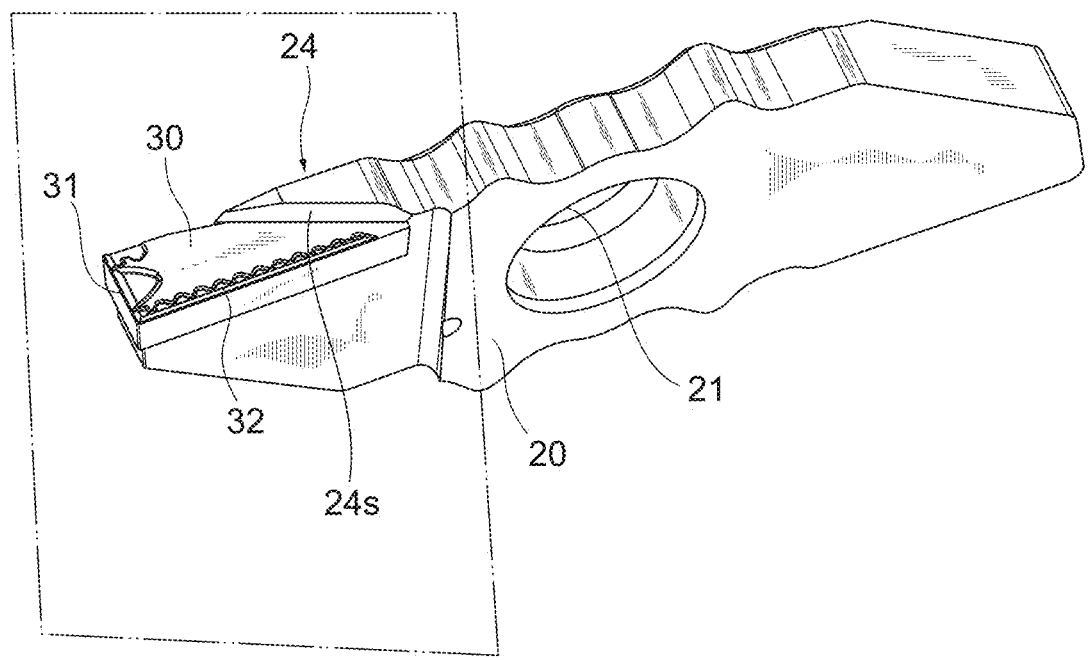
FIG. 4 is a perspective view obtained by viewing the cutting insert at another angle.

The cutting edge body 30 is made of the ultrahigh-pressure sintered body formed in a prismatic shape having a longitudinal direction x extending in the grooving direction, a lateral direction y perpendicular to the longitudinal direction x and extending in the lateral feed direction, and a vertical direction z perpendicular to each of the longitudinal direction x and the lateral direction y (see FIGS. 3 and 4 and the like). The cutting edge body 30 has an upper surface 30$u$ and a lower surface serving as a mounting surface with respect to the substrate 20 each formed in a substantially trapezoidal shape (see FIG. 7 and the like). Between the upper surface 30$u$ and the lower surface, a peripheral side surface 30$s$ is formed (see FIG. 5 and the like). The cutting edge body 30 thus configured is formed with a cutting edge (a front cutting edge 31, one side cutting edge 32, and another side cutting edge 37), recessed parts 33 and 38, a wall part 34, and the like (see FIGS. 6 to 11 and the like).

Figure 5:
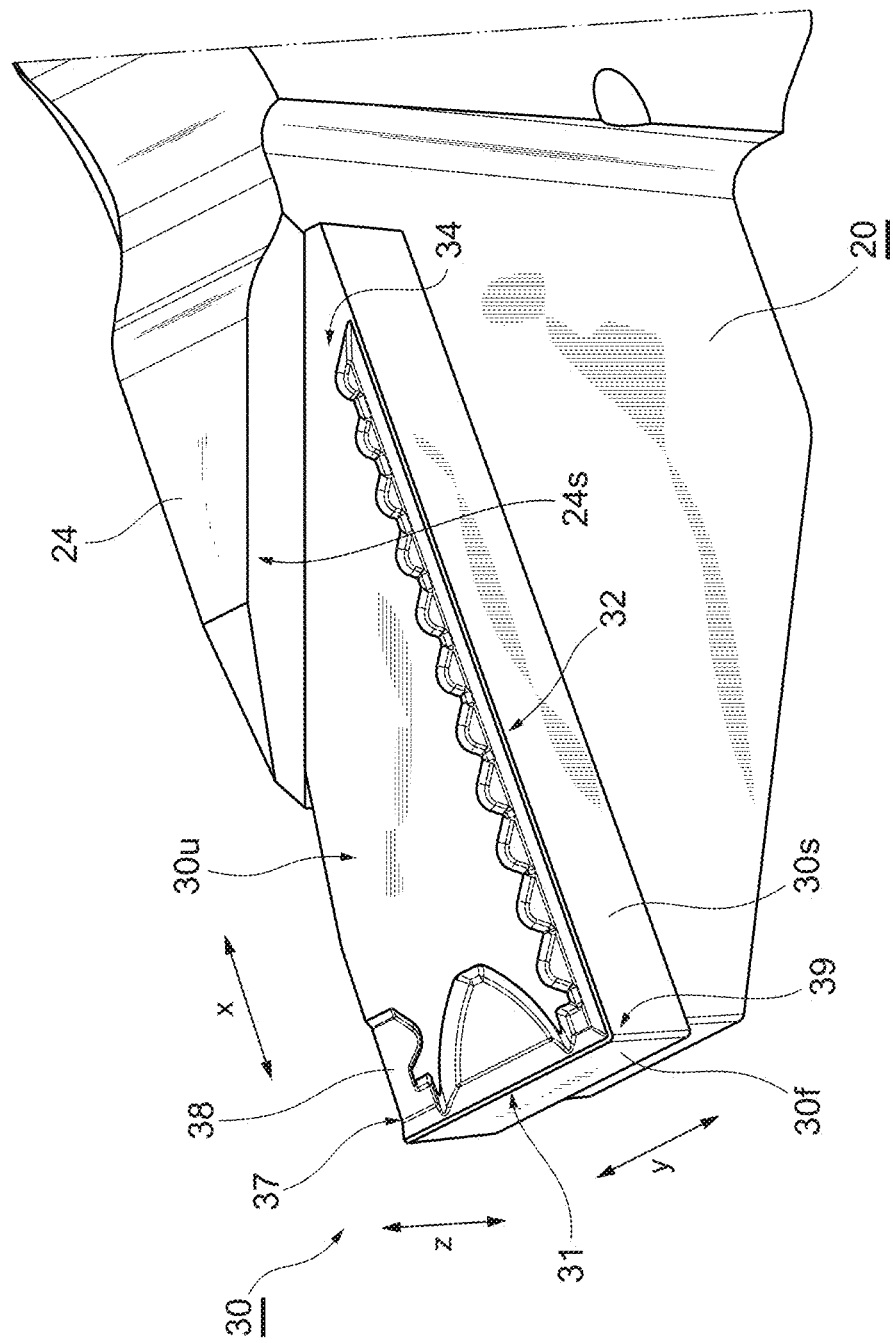
FIG. 5 is a diagram illustrating a frame portion in FIG. 4 in enlarged relation.

The cutting edge includes the front cutting edge (having a length of 2 mm given by way of example for reference, though the length is by no means limited) 31 formed on an intersecting edge between the peripheral side surface 30$s$ and the upper surface 30$u$ of the cutting edge body 30 and the side cutting edge (having a length of 6 mm similarly given by way of example for reference) 32 (see FIG. 5 and the like). The front cutting edge 31 and the side cutting edge 32 are connected via a corner cutting edge (a corner R has a radius of 0.05 mm given by way of example for reference, though a size thereof is by no means limited) 39 (see FIG. 7 and the like). The front cutting edge 31 is formed on an intersecting edge between a leading-end-side surface (front surface 30$f$ (Note that the front surface 30$f$ is a portion of the peripheral side surface 30$s$)) in the longitudinal direction x and the upper surface 30$u$ to be used when groove machining is performed on the work 100. The front cutting edge 31 in the present embodiment is formed perpendicular to the longitudinal direction x of the cutting edge body 30. In the vicinity of the front cutting edge 31, a recessed part 35 including a rake surface is provided (see FIGS. 7, 13A, and 13B and the like).

Figure 6:
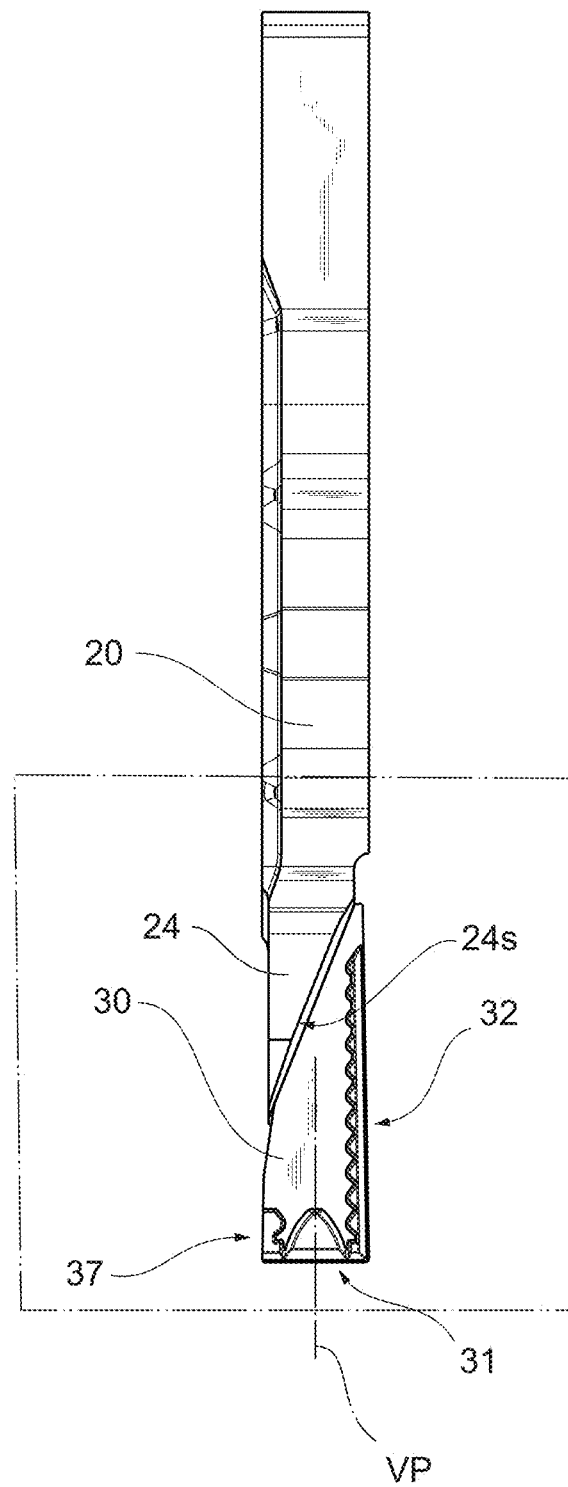
FIG. 6 is a plan view of the cutting insert.
Figure 7:
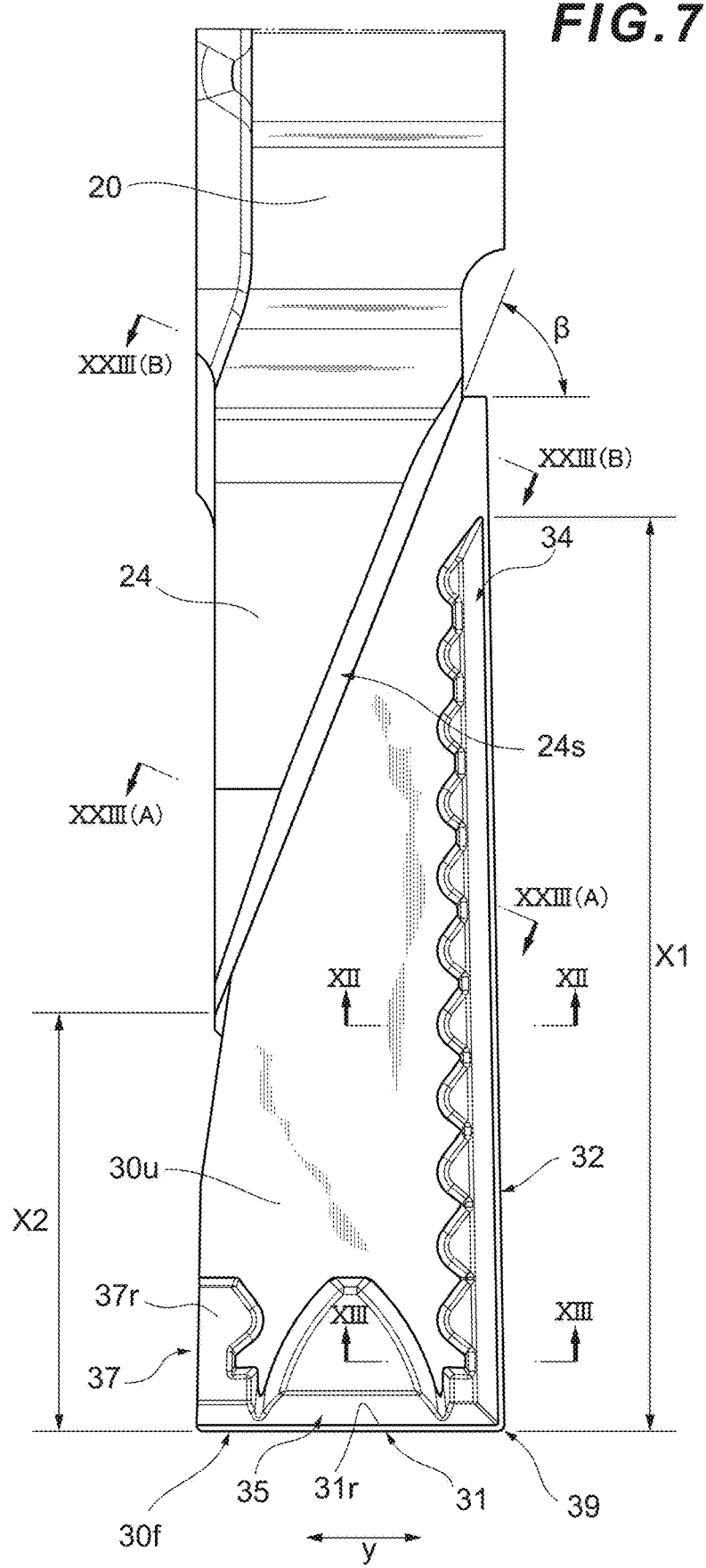
FIG. 7 is a diagram illustrating a frame portion in FIG. 6 in enlarged relation.
Figure 8:
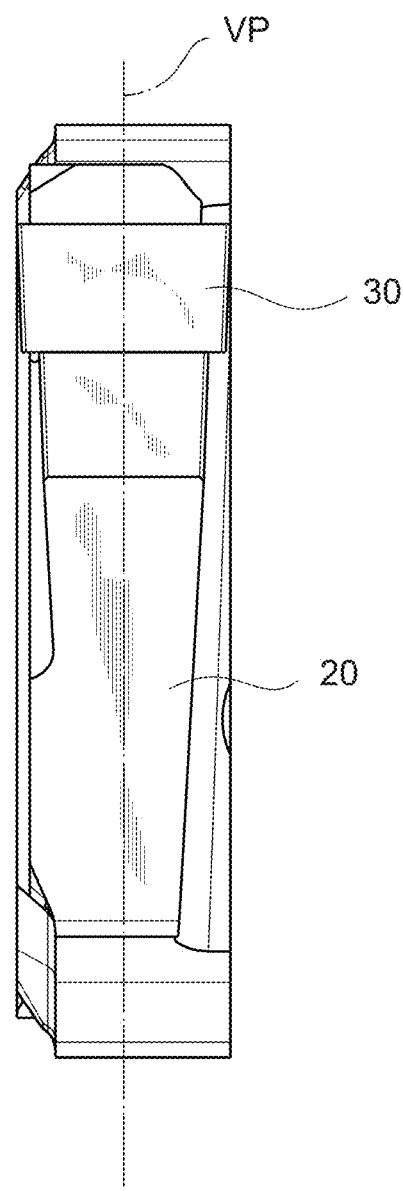
FIG. 8 is a front view obtained by viewing the cutting insert from a leading end side along a longitudinal direction thereof.
Figure 9:
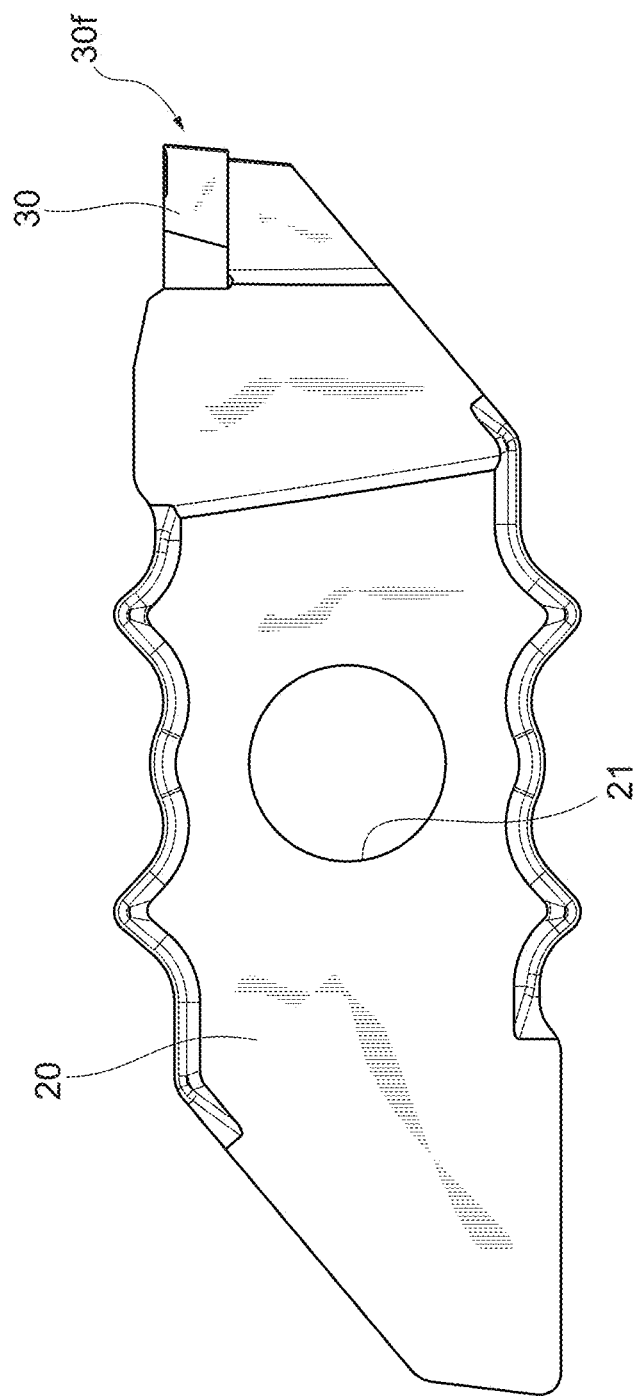
FIG. 9 is a left side view of the cutting insert.

The side cutting edges 32 and 37 are formed respectively on one end side and another end side in the lateral direction y with respect to a virtual perpendicular plane VP perpendicular to the front cutting edge 31 and halving the front cutting edge 31 (see FIGS. 6 and 8 and the like). The one side cutting edge 32 is formed on an intersecting edge between a side surface (which is a right side surface in the case of the present embodiment (see FIG. 10)) on one end side in the lateral direction y and the upper surface 30$u$ to be used when lateral feed machining is performed on the work 100. The other side cutting edge 37 is formed on an intersecting edge between a side surface (which is a left side surface in the case of the present embodiment (see FIG. 9)) on the other end side in the lateral direction y and the upper surface 30$u$. The other side cutting edge 37 is formed to have a length in the longitudinal direction x which is shorter than that of the one side cutting edge 32 (see FIG. 7 and the like).

Each of the recessed parts 33 and 38 is formed at a position on the upper surface 30$u$ to be subsequent to the one side cutting edge 32 in the lateral direction y (see FIGS. 12A, 12B, 13A, and 13B and the like). In the present embodiment, the one recessed part 33 and the other recessed part 38 are formed respectively on the one end side and the other end side in the lateral direction y with respect to the virtual perpendicular plane VP perpendicular to the front cutting edge 31 and halving the front cutting edge 31 (see FIG. 7 and the like). These recessed parts 33 and 38 are formed so as to be asymmetrical with respect to the virtual perpendicular plane VP being interposed therebetween (see FIG. 7 and the like). A portion of the recessed part 33 (portion rising from the recessed part 33 to the upper surface 30$u$) is provided with the wall part 34 made of a rising wall surface (see FIGS. 7 and 14 and the like).

Of the recessed part 33, the portion closest to the side cutting edge 32 is formed with a flank functioning as a rake surface 32$r$ of the side cutting edge 32. The side cutting edge 32 is connected to the rake surface 32$r$ in a cross section perpendicular to the side cutting edge 32 (see FIGS. 12A, 12B, 13A, and 13B). The rake surface 32$r$ in the present embodiment has a positive rake angle. Likewise, the other side cutting edge 37 is connected to a rake surface 37$r$ having a positive rake angle in a cross section perpendicular to the side cutting edge 37, though not particularly illustrated in detail (see FIG. 7 and the like). The front cutting edge 31 is also connected to a rake surface 31r having a positive rake angle in a cross section perpendicular to the front cutting edge 31 (see FIG. 7 and the like). These rake surfaces 31r, 32r, and 37r have widths constant with respect to the respective cutting edges (the front cutting edge 31, the side cutting edge 32, and the side cutting edge 37) (having dimensions constant with respect to the individual cutting edges). In addition, the end portions of the individual rake surfaces 31r, 32r, and 37r more distant from the cutting edges (the front cutting edge 31, the side cutting edge 32, and the side cutting edge 37) are connected to planes parallel to the upper surface 30u of the cutting edge body 30 (see FIGS. 12A, 12B, 13A, and 13B).

Note that each of the rake surfaces 31r, 32r, and 37r may also include a plurality of surfaces, though not particularly illustrated, and the one (first rake surface) of the plurality of surfaces closest to the corresponding cutting edge (the front cutting edge 31, the side cutting edge 32, or the side cutting edge 37) may also be configured to function as a land part (narrow first rake surface). When such land parts are formed, the individual cutting edges (the front cutting edge 31, the side cutting edge 32, and the side cutting edge 37) are connected to the rake surfaces (the other portions thereof) via the respective land parts. To give a specific example, each of the land parts parallel to the front cutting edge 31 and the side cutting edges 32 and 37 may also be provided to have a width of, e.g., 0.05 mm, though not illustrated. Alternatively, it may also be possible that the rake surfaces each having a rake angle of 21° in cross sections on planes perpendicular to the individual cutting edges (the front cutting edge 31, the side cutting edge 32, and the side cutting edge 37) are formed, and the rake surfaces formed of planes (land parts) parallel to the individual cutting edges are connected thereto. Note that each of the recessed parts including the rake surface 31r, 32r, and 37r may also be formed to have a minimum required depth in consideration of cost and the like.

Figure 14:
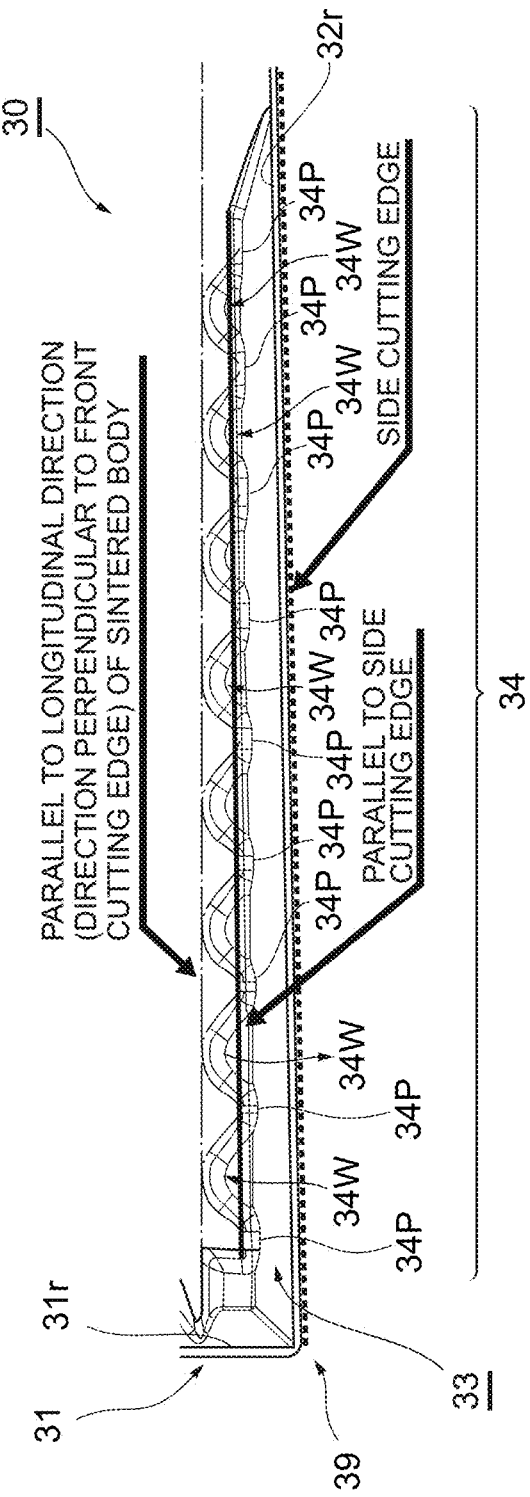
FIG. 14 is a plan view illustrating a portion of a cutting edge formed in an ultrahigh-pressure sintered body (cutting edge body) of the cutting insert in enlarged relation.

The wall part 34 is configured to have a wavy wall surface 34W and a discrete wall surface 34P (see FIG. 14 and the like). The wall part 34 in the present embodiment is configured such that, in a top view of the cutting edge body 30, the wavy wall surface 34W having a wavy periodic shape and the discrete wall surface 34P are connected along the longitudinal direction x (see FIG. 7 and the like).

The wavy wall surface 34W includes a plurality of curved surfaces each having a recessed shape which are aligned in the longitudinal direction x so as to undulate along the lateral direction y (see FIG. 14 and the like). The number of the wall surfaces included in the wavy wall surface 34W is not particularly limited but, preferably, the wavy wall surface 34W is provided with at least three or more wall surfaces and has a waveform having at least 3 or more periods.

The discrete wall surface 34P is formed of a wall surface including a plurality of wall surfaces formed at positions located between the wavy wall surface 34W and the side cutting edge 32 and discrete along the longitudinal direction x (see FIG. 14 and the like). The plurality of wall surfaces included in the discrete wall surface 34P are formed as planes each having an end on a connection line (i.e., an intersecting edge denoted by the reference sign 34c in FIG. 13B) of a plane parallel to the rake surface 32r and the upper surface 30u to be connected to the wavy wall surface 34W. The plurality of wall surfaces included in the discrete wall surface 34P are also provided as wall surfaces such that respective angles (denoted by the reference sign a in FIG. 13B) formed between the upper surface 30u of the cutting edge body 30 and the plurality of wall surfaces in a virtual cross section corresponding to a plane perpendicular to the side cutting edge 32 are 90° or more (by way of example, the wall surfaces satisfy $\alpha=135°$ in the present embodiment) (see FIGS. 13A and 13B). Note that, in the present embodiment, only portions of the cutting edge body 30 made of the ultrahigh-pressure sintered body, not the entire cutting edge body 30, are used as the cutting edges, and the cutting edge body 30 has a portion having neither cutting edge nor rake surface (see FIG. 7 and the like).

In the cutting edge body 30 in the present embodiment, the wavy wall surface 34W and the discrete wall surface 34P are formed as follows. Specifically, the wavy wall surface 34W is formed such that the plurality of wall surfaces included in the wavy wall surface 34W have dimensions (widths and amplitudes) gradually decreasing with increasing distance from the front cutting edge 31 along the longitudinal direction x (see FIG. 7 and the like). Meanwhile, the discrete wall surface 34P is formed such that the plurality of wall surfaces included in the discrete wall surface 34P are disposed at intervals decreasing with increasing distance from the front cutting edge 31 along the longitudinal direction x (see FIG. 7 and the like). In addition, of the wavy wall surface 34W, deepest wall portions (portions most distant from the side cutting edge 32) are disposed to be parallel (i.e., along a straight line parallel to the longitudinal direction x) to the longitudinal direction x of the cutting edge body 30 (see the portion indicated by the dash-dot line in FIG. 14). Meanwhile, the discrete wall surface 34P is disposed parallel to a line (see the portion indicated by the broken line in FIG. 14) extending in side-by-side relation with the side cutting edge 32 (i.e., along a straight line parallel with the side cutting edge 32) (see the portion indicated by the solid line in FIG. 14).

Substrate

Figure 2:
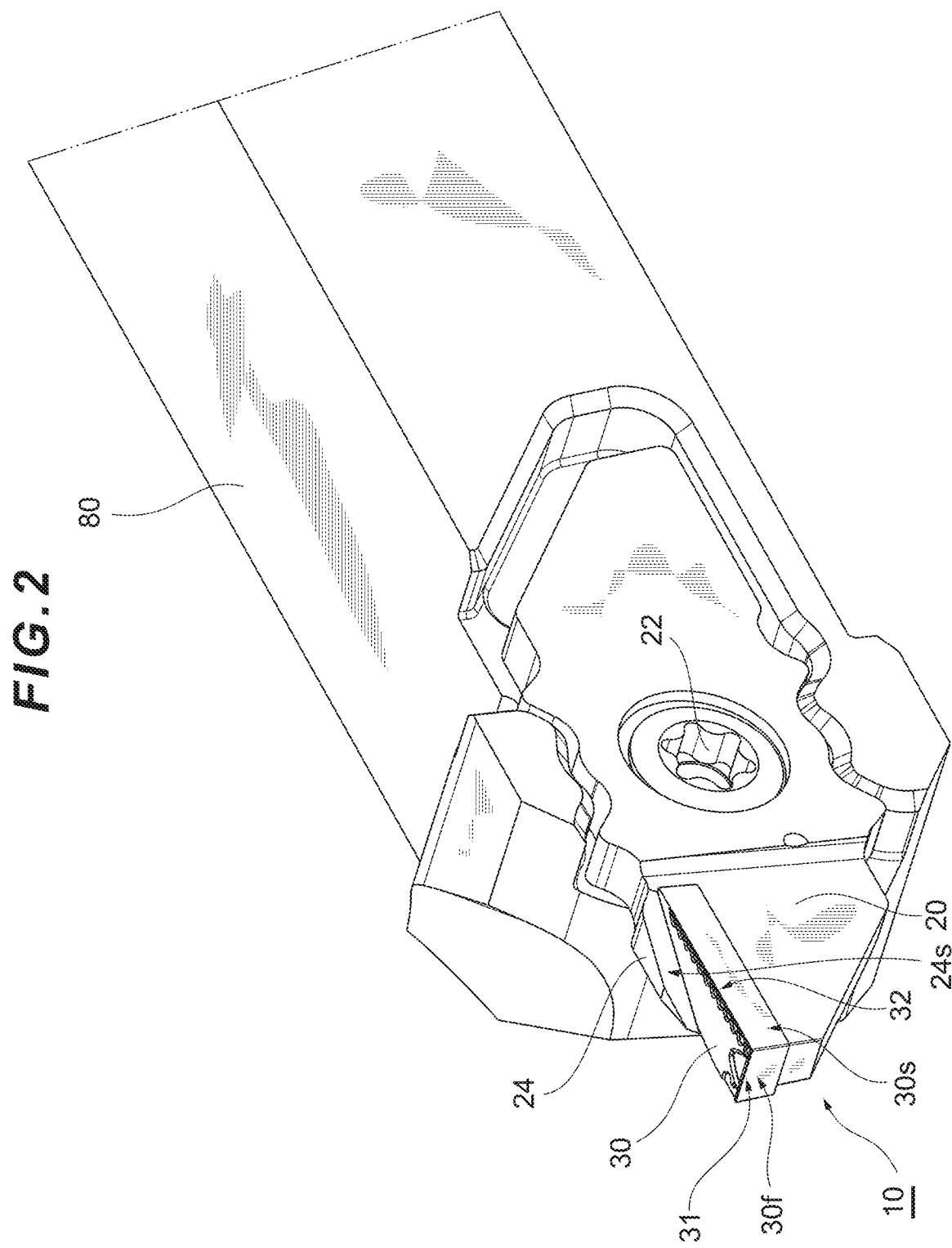
FIG. 2 is a diagram illustrating a frame portion in FIG. 1 in enlarged relation.

The substrate (base insert) 20 is a member for holding the cutting edge body 30 joined thereto by brazing and mounted on the cutting tool holder 80 by screwing (see FIGS. 1 and 2). The substrate 20 is provided with a screw hole 21 extending therethrough in, e.g., the lateral direction y of the cutting edge body 30 to screw the substrate 20 to the cutting tool holder 80 by using a screw 22 (see FIGS. 2 and 3 and the like). By the screwing, the cutting insert 10 is mounted in a longitudinally mounted state (a state where the front surface 30f of the cutting edge body 30 faces a leading end side of the cutting tool holder 80 in the longitudinal direction) on the cutting tool holder 80 (see FIG. 1 and the like).

Figure 10:
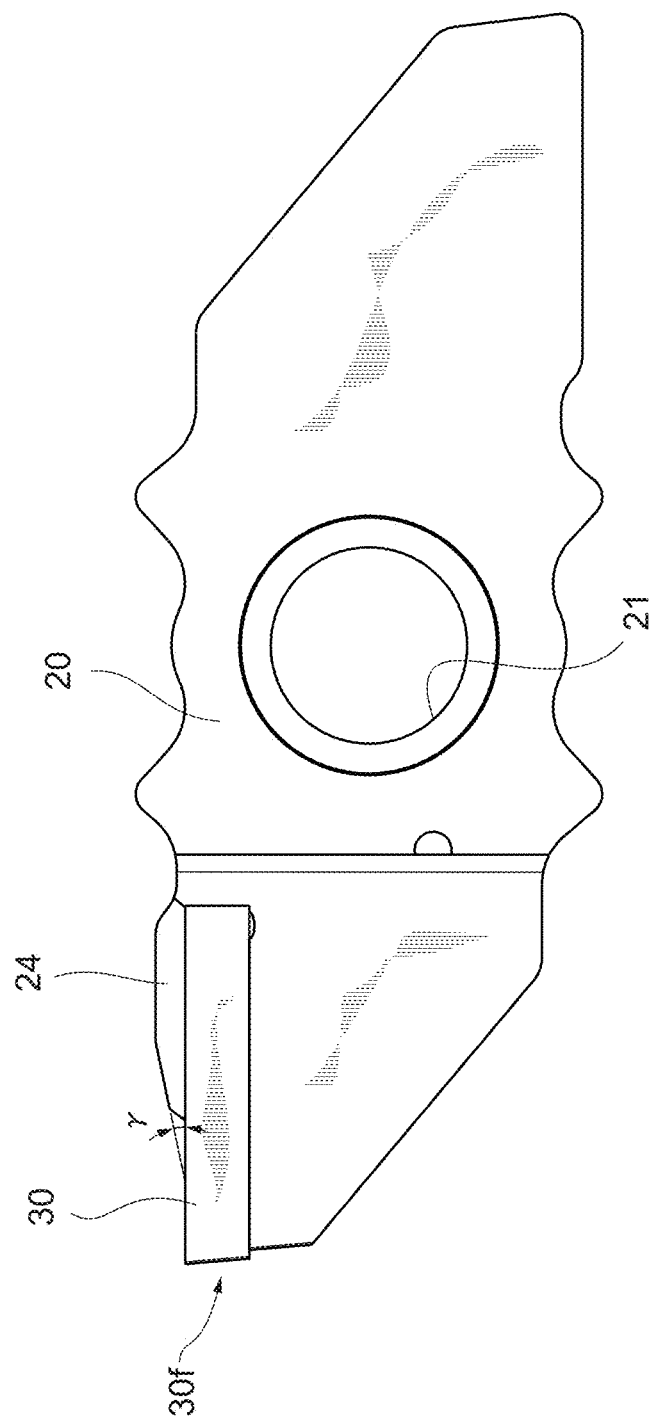
FIG. 10 is a right side view of the cutting insert.
Figure 11:
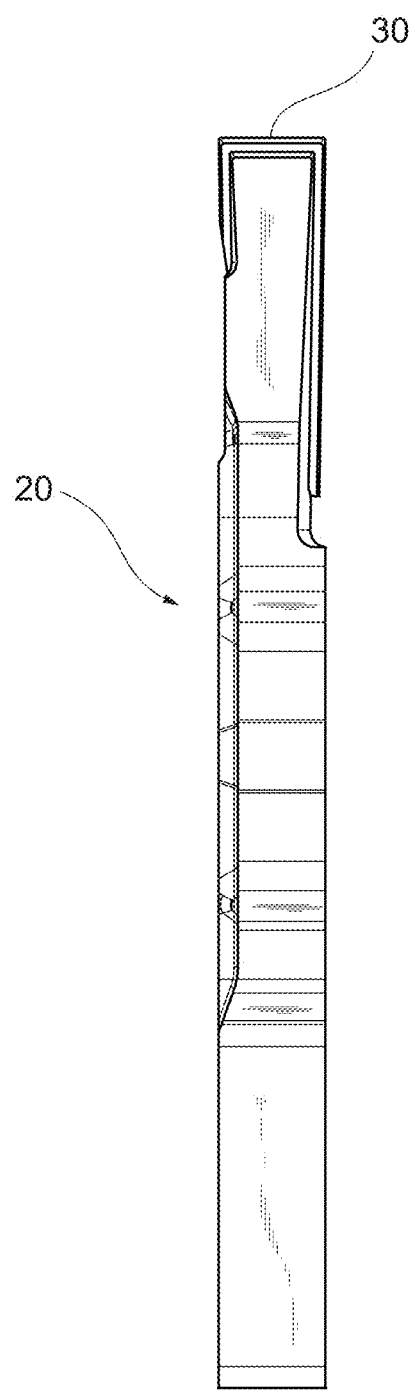
FIG. 11 is a bottom view of the cutting insert.
Figure 12B:
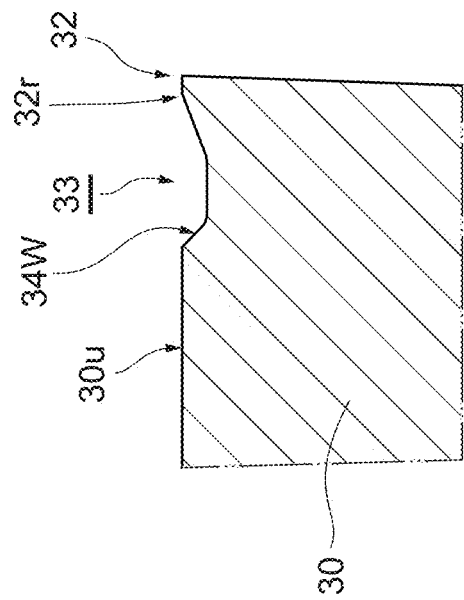
FIG. 12B is a diagram illustrating a frame portion in the cross-sectional view illustrated in FIG. 12A in enlarged relation.
Figure 12A:
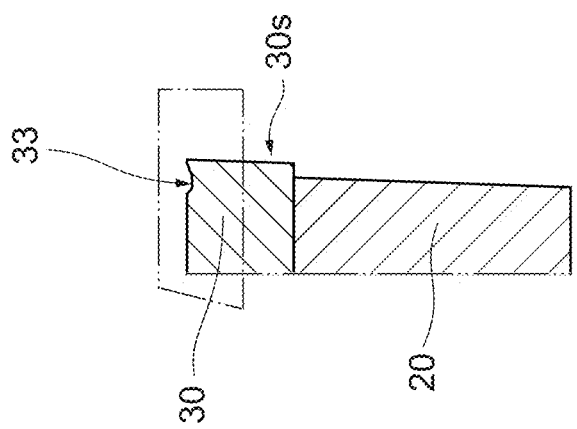
FIG. 12A is a cross-sectional view along a line XII-XII in FIG. 7.

The substrate 20 is also formed with a projected part 24 upwardly projecting from a portion of the cutting edge body 30 (see FIGS. 5 and 10 and the like). For example, in the cutting insert 10 in the present embodiment, the projected part 24 is formed to protrude upward to reach a level higher than a highest position (i.e., the upper surface 30u) of the cutting edge body 30 in the vertical direction z. The projected part 24 is formed in a shape which may allow the projected part 24 to function as a chip breaker depending on circumstances so as to be able to appropriately control chips formed under a predetermined cutting condition on the other end side opposite to the one end side (side on which the side cutting edge 32 is formed in the case of the present embodiment) in the lateral direction y (see FIG. 3 and the like). For example, the projected part 24 in the present embodiment is formed as follows.

First, the projected part 24 is shaped to have an inclined surface 24s which is inclined with respect to the side cutting edge 32 in a top view (see FIG. 6 and the like). The inclined surface 24s is formed to be inclined from the other end side in the lateral direction y to gradually approach the one end side (side on which the side cutting edge 32 is formed in the case of the present embodiment) with increasing distance from the front surface of the cutting edge body 30 (see FIGS. 6 and 7 and the like). When it is assumed that an angle of the inclined surface 24s with respect to the lateral direction y in a top view is β as an example of a reference (see FIG. 7), the angle β is preferably set to fall within a range of, e.g., 60 to 80° in terms of chip control described later.

Figure 23A:
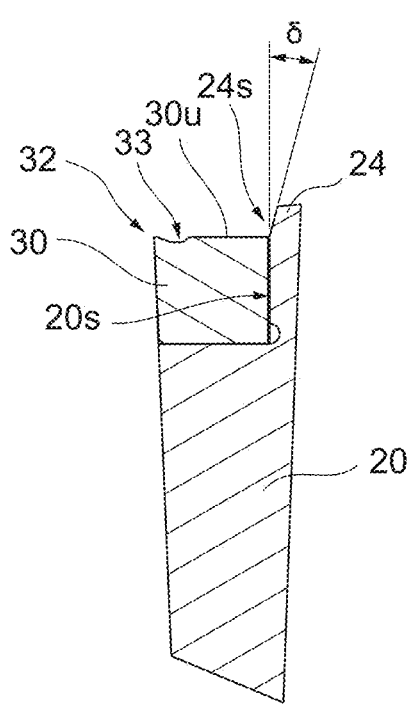
FIG. 23A is a cross-sectional view of the cutting insert along a line XXIII(A)-XXIII(A) in FIG. 7.
Figure 23B:
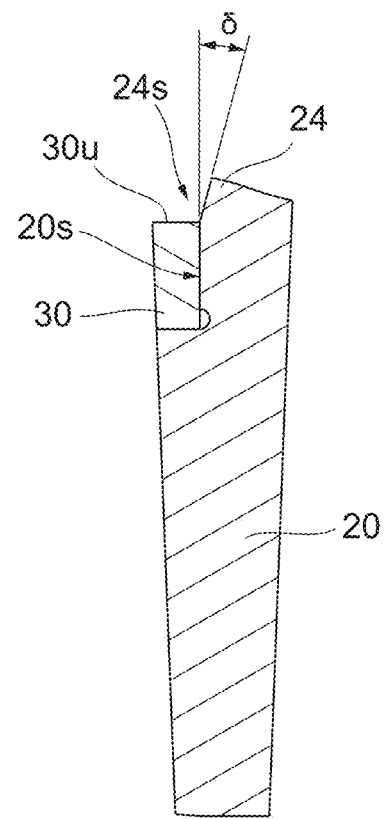
FIG. 23B is a cross-sectional view of the cutting insert along a line XXIII(B)-XXIII(B) in FIG. 7.

In addition, the projected part 24 is formed to have an inclination angle γ of 5 to 10° with respect to a plane (x-y plane) perpendicular to the vertical direction z (see FIG. 10) and shaped to upwardly project with increasing distance from the front surface 30f of the cutting edge body 30 and reach a maximally projecting portion. The projected part 24 is also formed such that an inclination angle δ of the inclined surface 24s with respect to a plane (e.g., a plane obtained by extending a wall surface 20s of the substrate 20 in contact with a portion of a peripheral side surface 30s of the cutting edge body 30) extending in the vertical direction has a value within a predetermined range (e.g., 5 to 70°, or preferably 5 to 10°) (see FIGS. 23A and 23B). The projected part 24 having the inclined surface 24s thus formed is preferred in terms of allowing chips discharged particularly during the high depth cutting to more smoothly flow, when bumping onto the projected part 24, to be controlled and thus allowing a resistance to be reduced.

Figure 21:
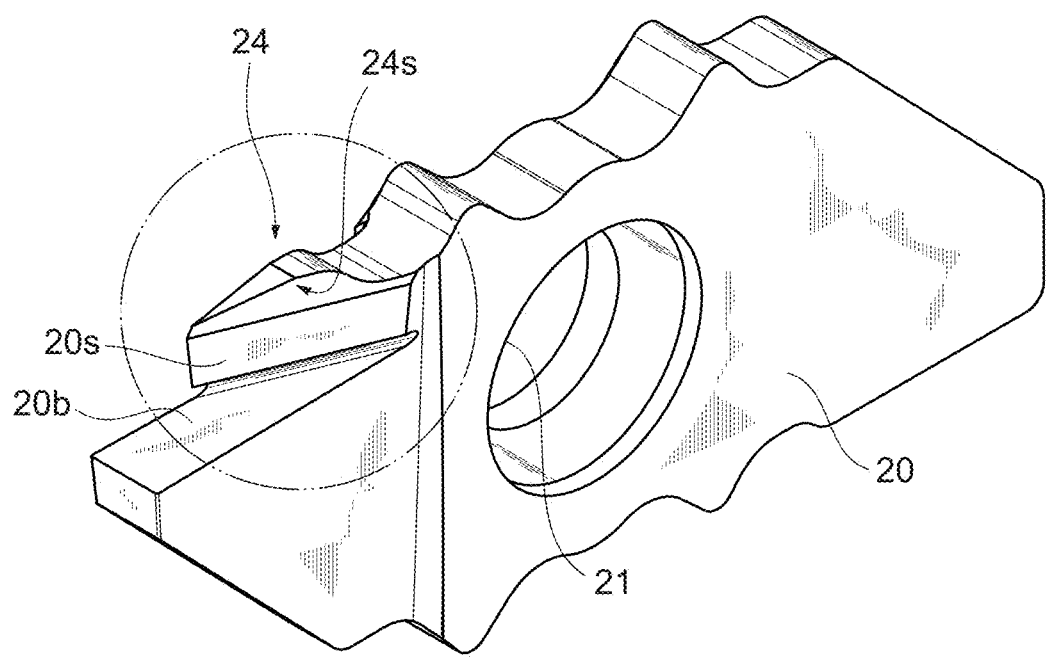
FIG. 21 is a perspective view illustrating an example of a substrate in a state where the cutting edge body is not joined thereto.
Figure 22:
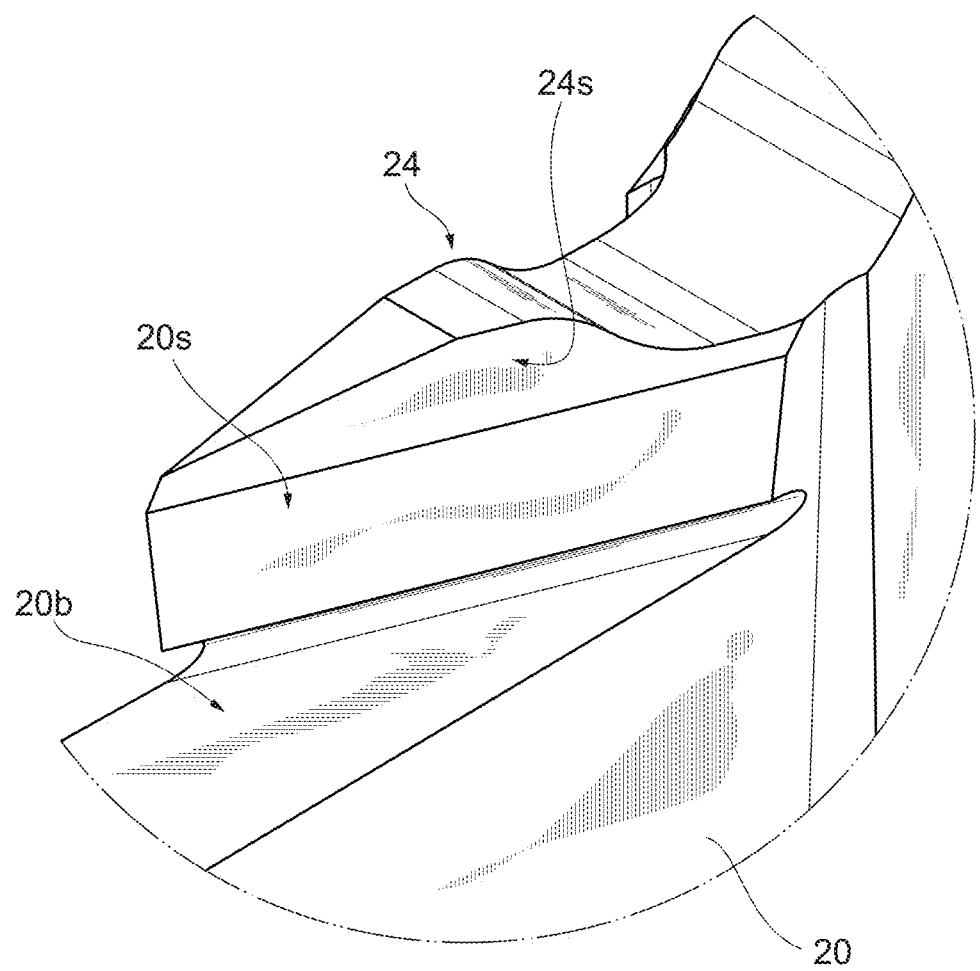
FIG. 22 is a diagram illustrating an encircled portion in FIG. 21 in enlarged relation.

The projected part 24 may also be formed into a shape connected to any one of junction surfaces at which the cutting edge body 30 and the substrate 20 are joined together. For example, in the cutting insert 10 in the present embodiment, the substrate 20 is joined to the cutting edge body 30 at a first contact surface (bottom supporting surface) 20b in contact with a bottom surface of the cutting edge body 30 and at the second contact surface (wall surface) 20s in contact with a portion of the peripheral side surface 30s of the cutting edge body 30 (see FIGS. 21 and 22). When, of these contact surfaces 20b and 20s, the second contact surface (wall surface) 20s is shaped to be smoothly connected to the inclined surface 24s of the projected part 24 described above, there is no need to provide a step between the second contact surface (wall surface) and the inclined surface 24s of the projected part 24, and it is possible to continuously configure the two surfaces as flush surfaces and configure the two surfaces as surfaces continuously joined with no step formed therebetween. The configuration is preferred in terms of further simplifying a shape of the substrate 20 and allowing cost required for forming to be reduced.

The projected part 24 is also formed at a position distant by a predetermined value X2 from the front surface 30f of the cutting edge body 30 and provided such that the inclined surface 24s spans from the position toward a base end side of the cutting tool holder 80 (see FIG. 7 and the like). The predetermined value X2 is set so as to satisfy X2>X1 when compared to a length X1 of the side cutting edge 32 (see FIG. 7. Note that X1 mentioned herein corresponds to the length of the side cutting edge 32, but generally refers to a length of a portion which may be involved in cutting of the work 100 during the lateral feed machining). Such setting of X1 means that, in other words, the side cutting edge 32 overlaps the inclined surface 24s of the projected part 24 in a range in which a coordinate in the longitudinal direction x exceeds X2 and reaches X1 (see FIG. 7 and the like).

As described above, by the cutting insert 10 in the present embodiment in which X1 is set to satisfy X2 (Distance from Front Surface 30f of Cutting Edge Body 30 to Projected part 24)>X1 (Length of Side Cutting Edge) (see FIG. 7 and the like), a structure to be referred to also as a dual-stage chip breaker is provided in which, during the low depth cutting, chips are controlled by using the wall surface 36 of the recessed part 33 and, during the high depth cutting, the chips 101 are controlled by using the inclined surface 24s of the projected part 24 of the substrate 20.

Cutting Tool Holder

Figure 24:
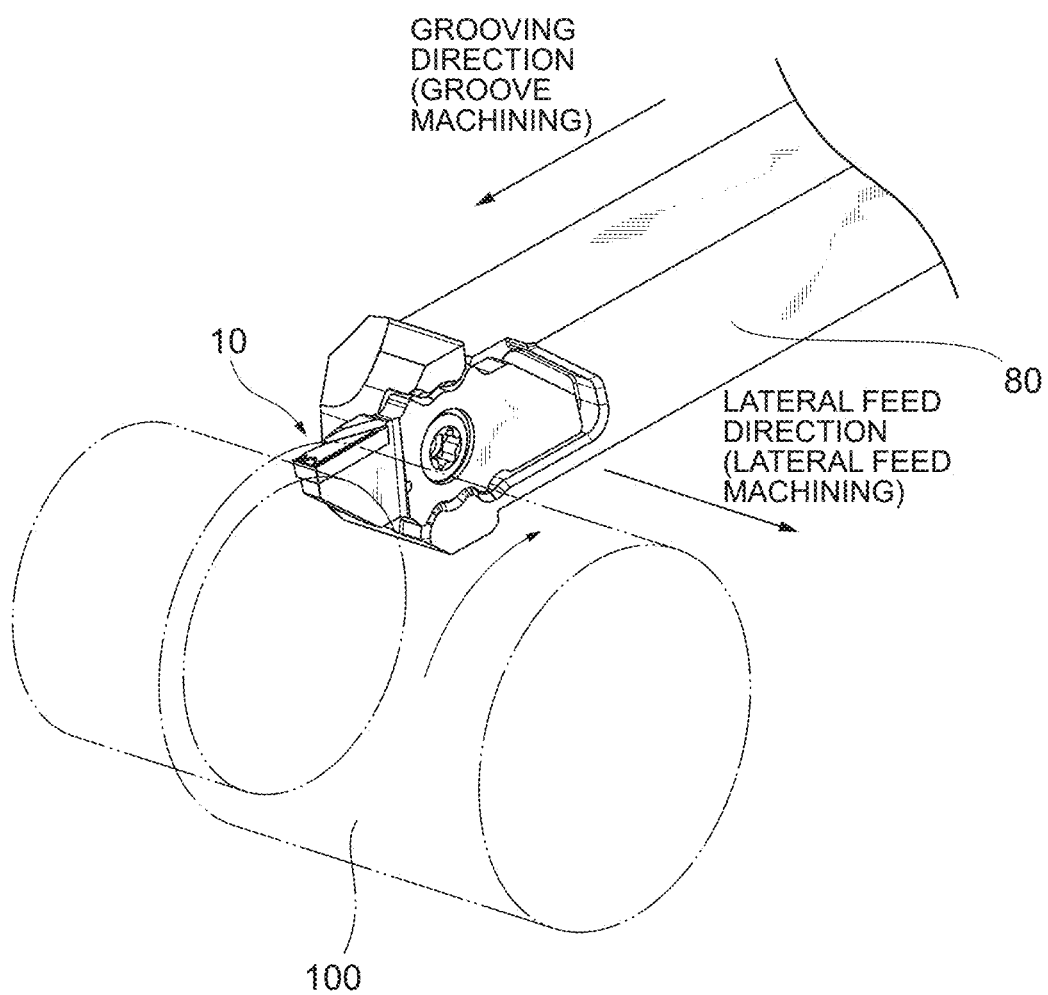
FIG. 24 is a perspective view of the work and the cutting insert, which briefly illustrates a grooving direction during groove machining and a lateral feed direction during lateral feed machining.
Figure 25:
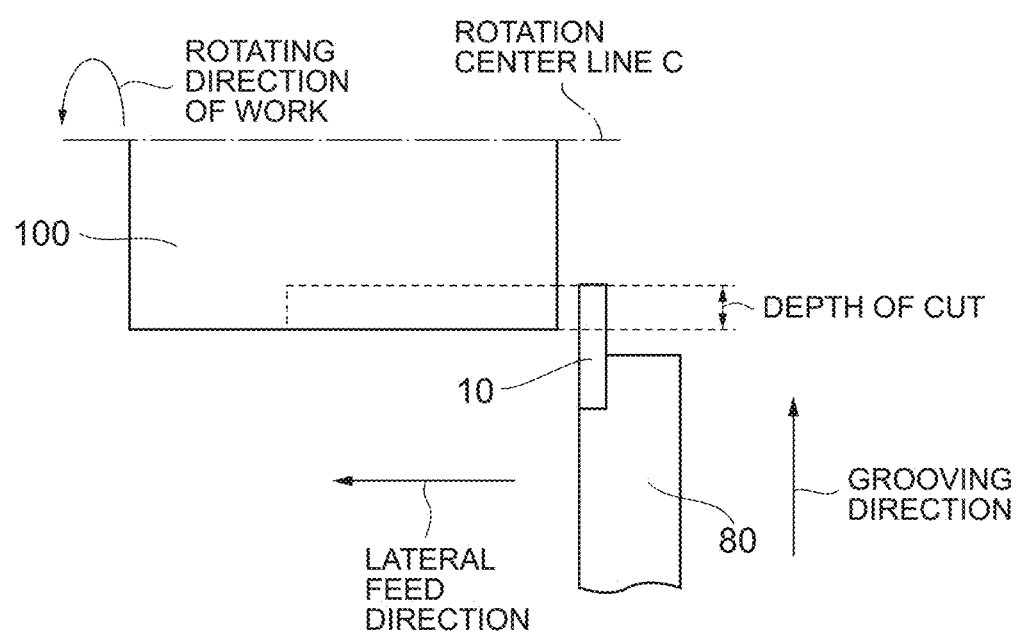
FIG. 25 is a plan view of the work and the cutting insert, which briefly illustrates the grooving direction during the groove machining and the lateral feed direction during the lateral feed machining.

The cutting tool holder 80 is the cutting tool holding the cutting insert 10 at a leading end portion thereof, and is provided to be capable of feeding in the grooving direction and the lateral feed direction by using the automatic lathe tool (illustration thereof is omitted) (see FIGS. 24 and 25 and the like).

Mode During Use

The cutting insert 10 configured as described above in the present embodiment is mounted on the cutting tool holder 80 and pressed against the work (workpiece) 100 rotating around a rotation center line C to cut the work 100 and transfer a predetermined shape thereto. Actually, the cutting insert 10 is first fed in the grooving direction along the longitudinal direction x of the cutting edge body 30 to perform groove machining, and further fed in the lateral feed direction along the lateral direction y perpendicular to the longitudinal direction x to perform lateral machining and external shape machining of the work 100 and thus form a rectangular groove measuring a length (width) of the front cutting edge 31 of the cutting edge body 30 or more (see FIGS. 24 and 25 and the like).

Characteristic Feature of Chip Control and Freedom of Feed

As described above, with the cutting insert 10 formed with the wavy wall surface 34W and the discrete wall surface 34P, it is possible to reduce resistance during cutting by appropriately controlling chips (denoted by a reference sign 101 in FIG. 15 and the like) through a so-called synergetic effect of these wavy wall surface 34W and discrete wall surface 34P as described below and thereby improve freedom of feed. Specifically, the thicknesses of the chips 101 have a correlation with conditions for feeding of the cutting insert 10, and the present embodiment uses the correlation property at the time of lateral feed machining and gives no deformation to the thick chips 101 formed under high-feed (relatively rapid feeding) conditions so as to prevent a jam of the chips 101, while giving a deformation to the thin chips 101 formed under low-feed (relatively slow feeding) conditions to control a direction of the deformation thereof and cut the thin chips 101. The following are further details (see FIGS. 15 to 20).

During High-Feed Operation

Figure 15:
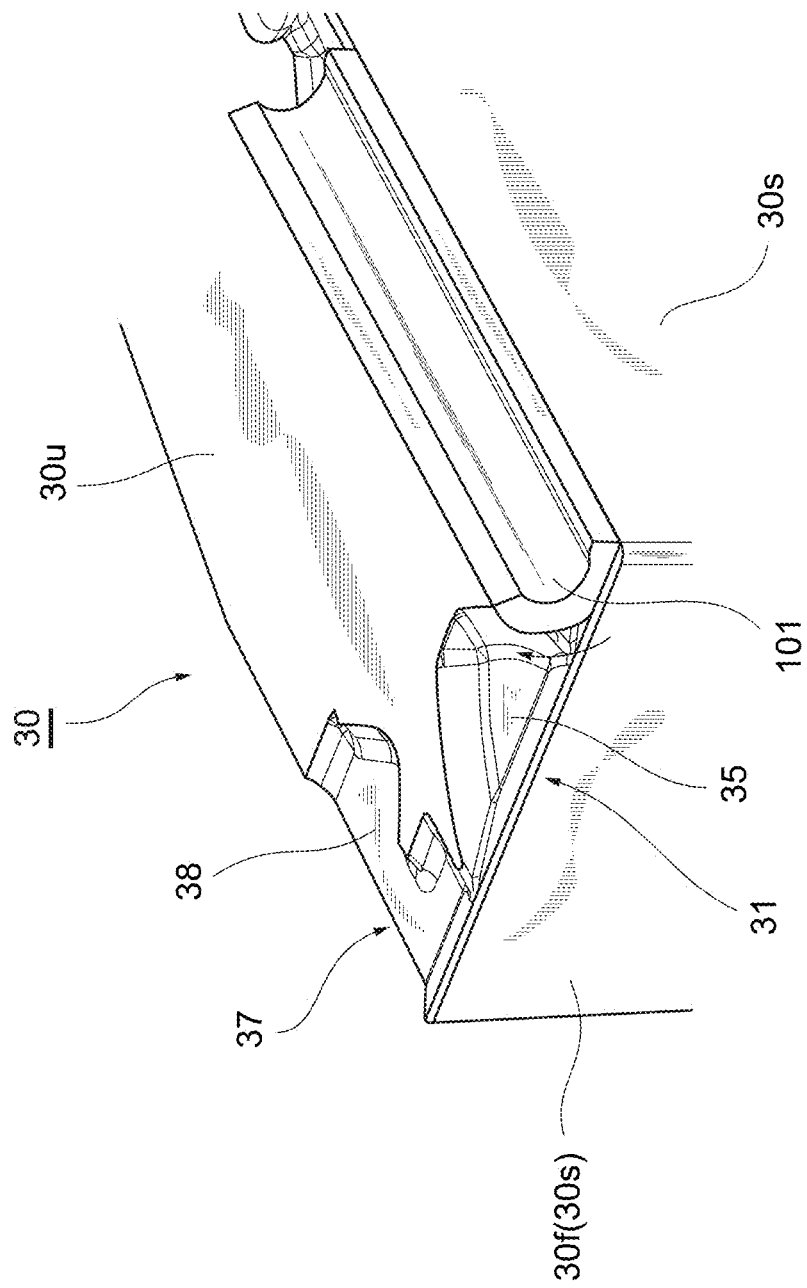
FIG. 15 is a perspective view schematically illustrating a state of chips from a work (workpiece) which is cut by a discrete wall surface during a high-feed operation of the cutting insert.
Figure 16:
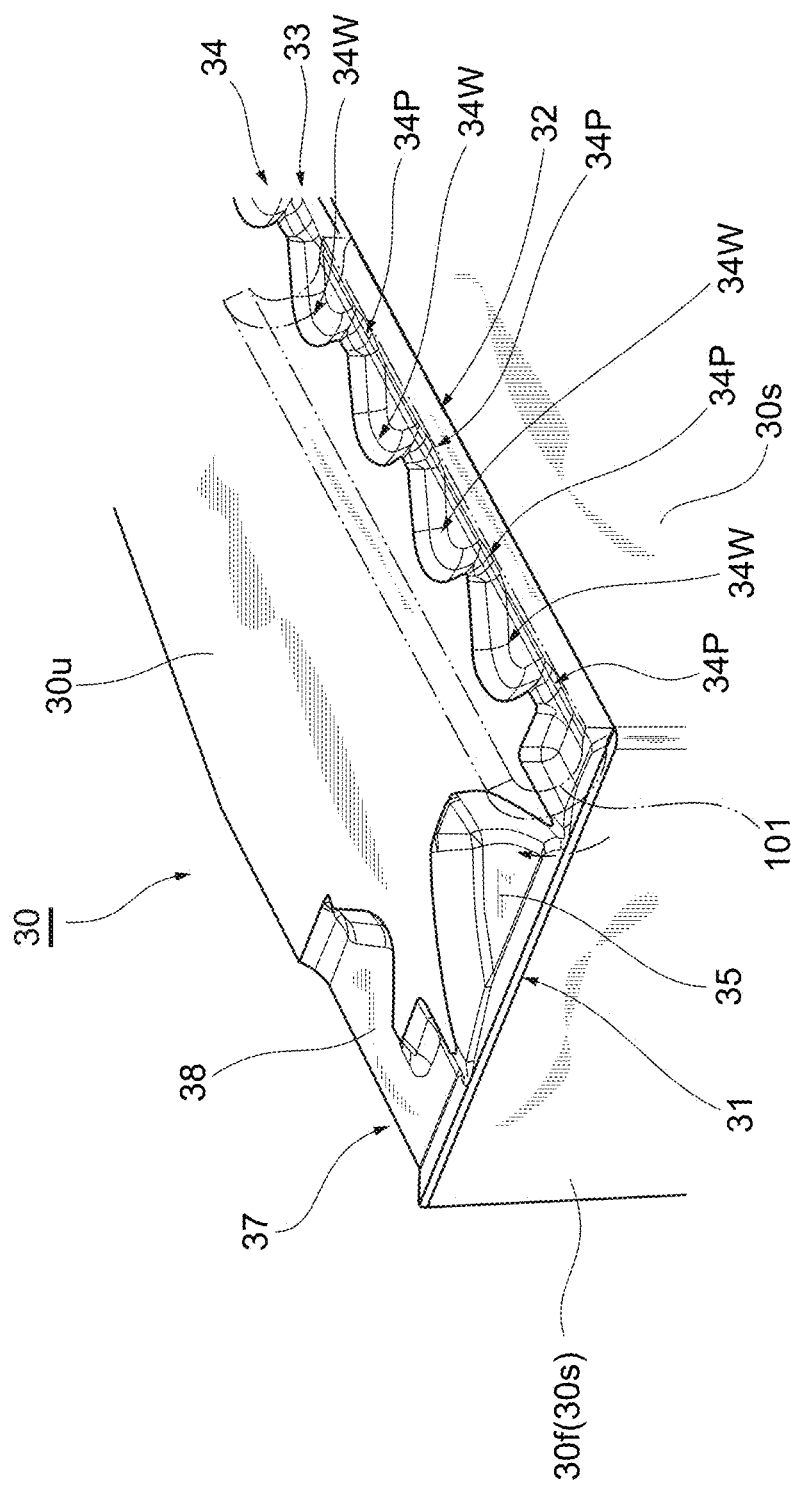
FIG. 16 is a perspective view illustrating the cutting edge and the like in a state where the chips illustrated in FIG. 15 are viewed in see-through relation.
Figure 17:
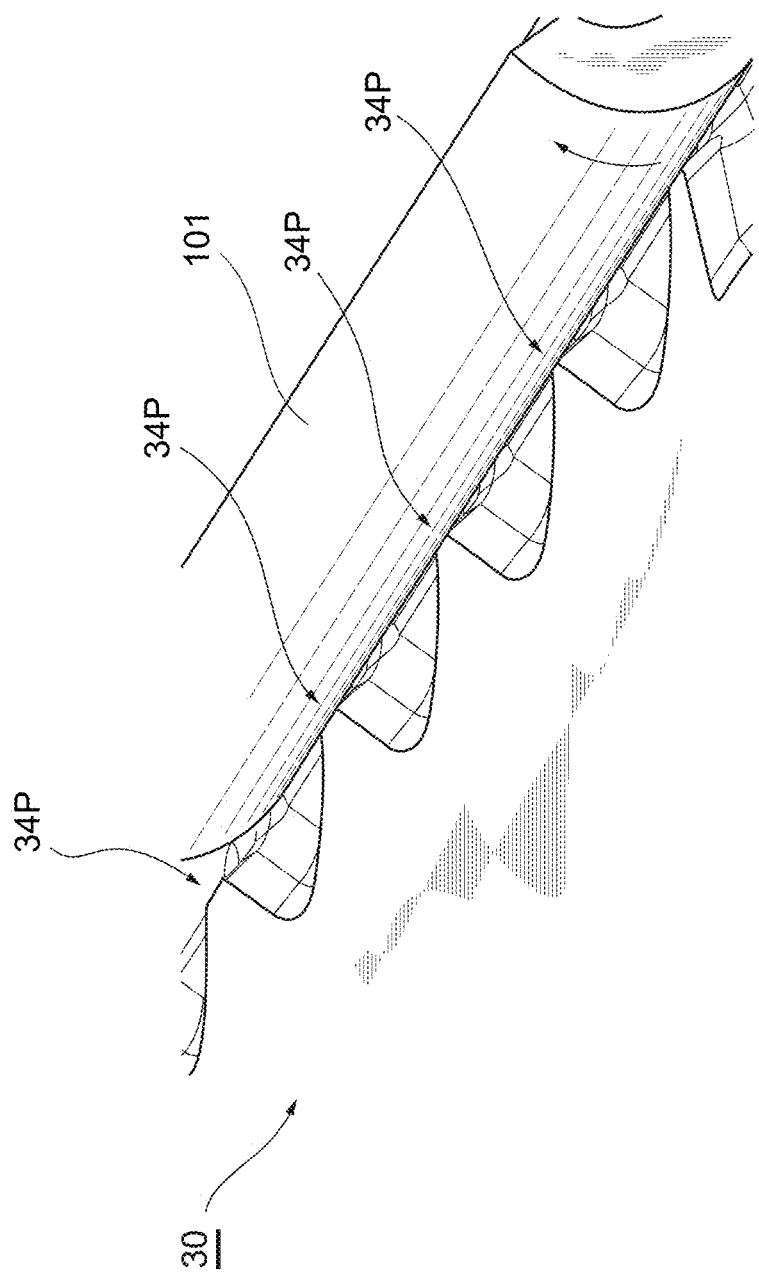
FIG. 17 is a perspective view schematically illustrating, at another angle, a state of the chips from the work which is cut by the discrete wall surface during the high-feed operation of the cutting insert.
Figure 26A:
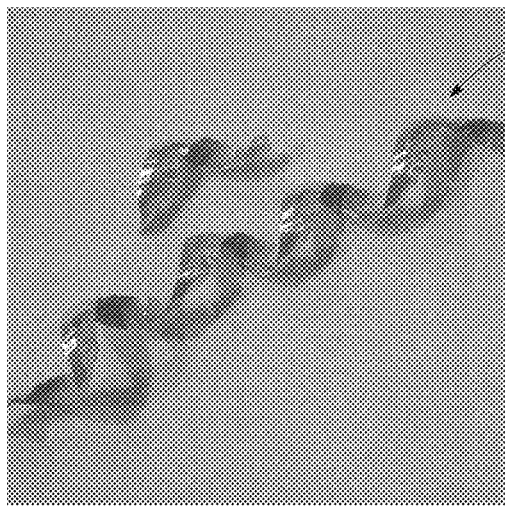
FIG. 26A illustrates an image of the chips from the work which is cut by the discrete wall surface during the high-feed operation of the cutting insert.
Figure 26B:
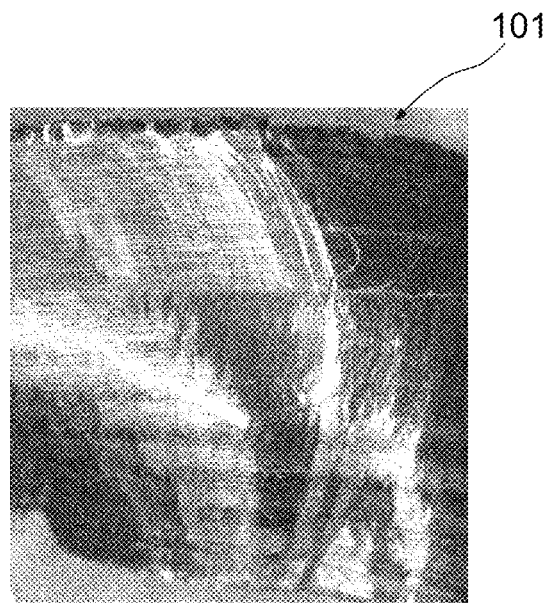
FIG. 26B illustrates an image obtained by enlarging a part of the image in FIG. 26A.

The discrete wall surface 34P raises (lifts up) the relatively thick chips 101 to inhibit the chips 101 from coming into contact with the wavy wall surface 34W (see FIGS. 15 to 17). By thus inhibiting the chips 101 from coming into contact with the wavy wall surface 34W, even when the workpiece of the work 100 has excellent extensibility and is likely to be welded, the chips 101 are easily prevented from being welded to the wavy wall surface 34W and buried therein or causing a jam (see FIGS. 26A and 26B). In addition, as can be understood from formation of the chips 101 into a coil shape (see FIG. 26A), it can be said that the chips 101 are generated with ease (i.e., with low cutting resistance).

By allowing a so-called linear chip breaker wall surface formed of the discrete wall surface 34P provided in the cutting edge body 30 to process (control) the relatively thick chips 101 during the high-feed operation, adaptability to a wide range of machining conditions including those during the high-feed operation is provided.

During Low-Feed Operation

Figure 18:
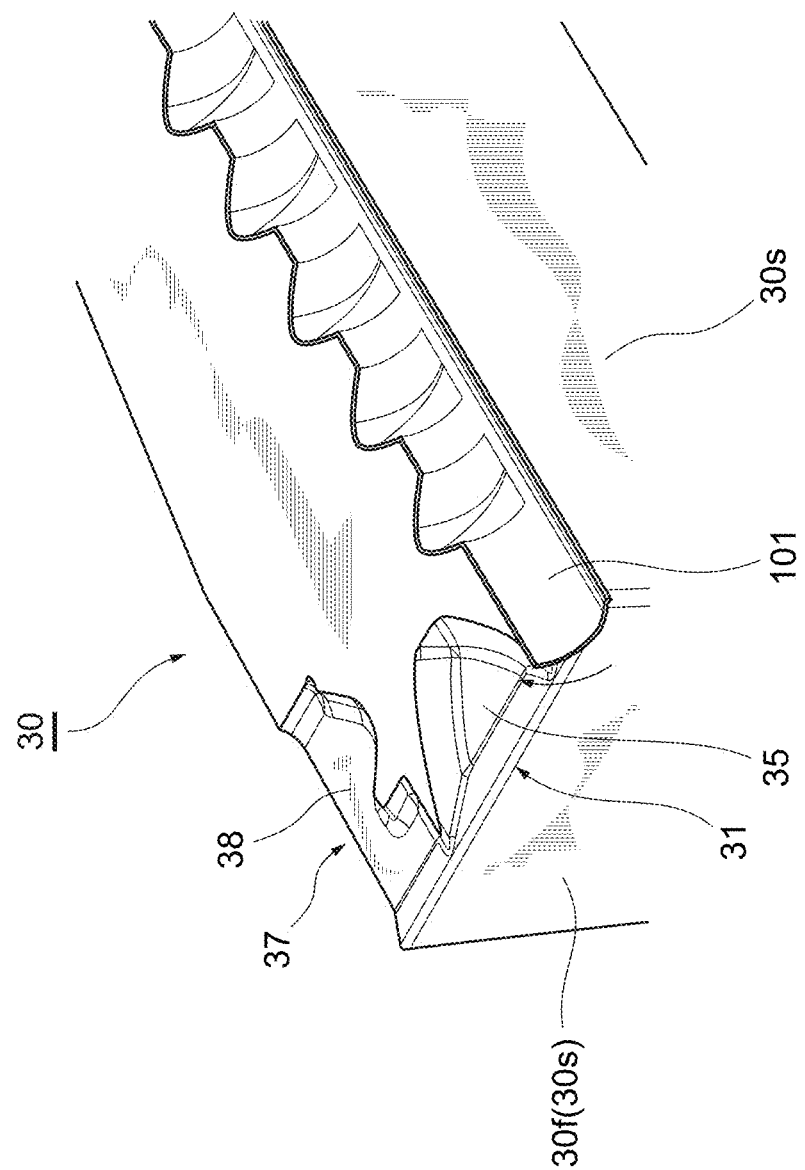
FIG. 18 is a perspective view schematically illustrating a state of the chips from the work which is cut by a wavy wall surface during a low-feed operation of the cutting insert.
Figure 19:
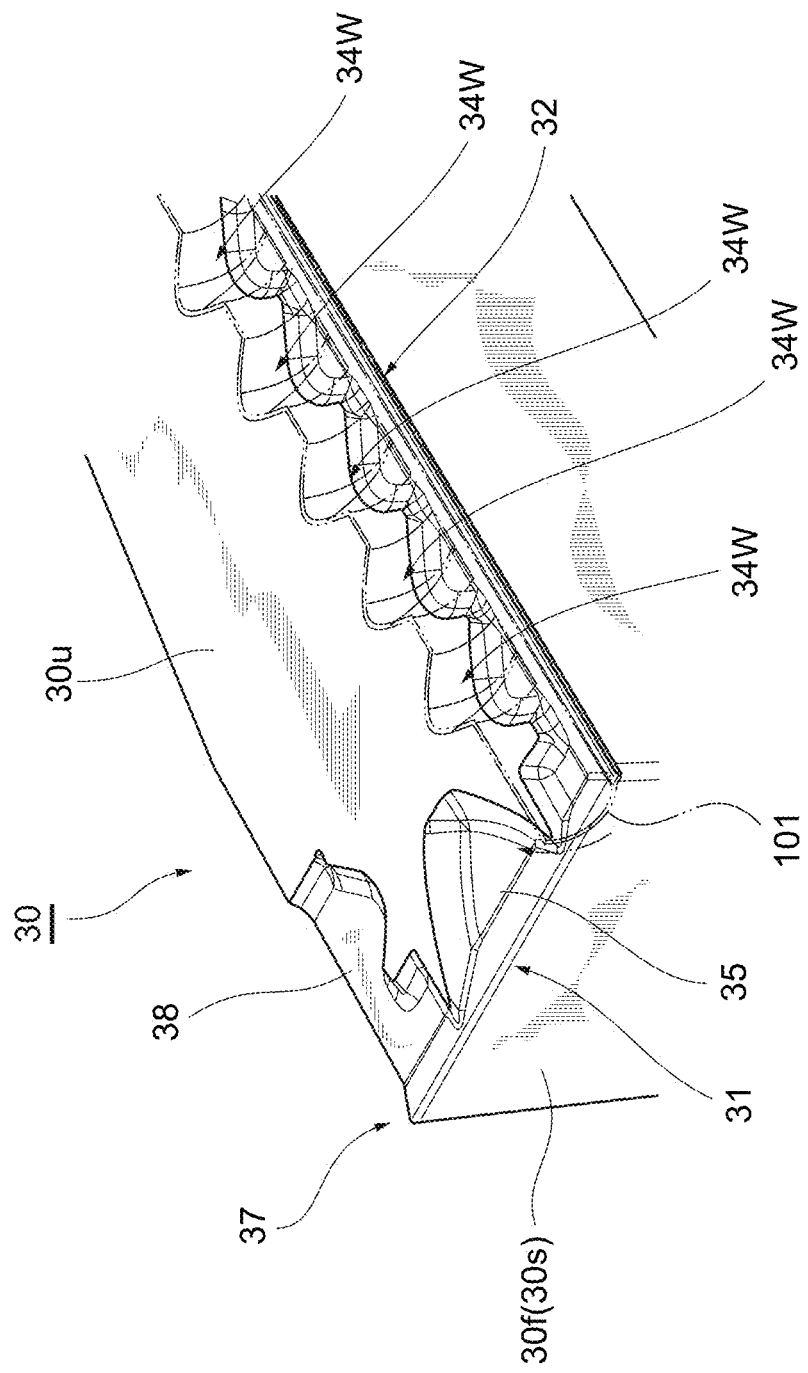
FIG. 19 is a perspective view illustrating the cutting edge and the like in a state where the chips illustrated in FIG. 18 are viewed in see-through relation.
Figure 20:
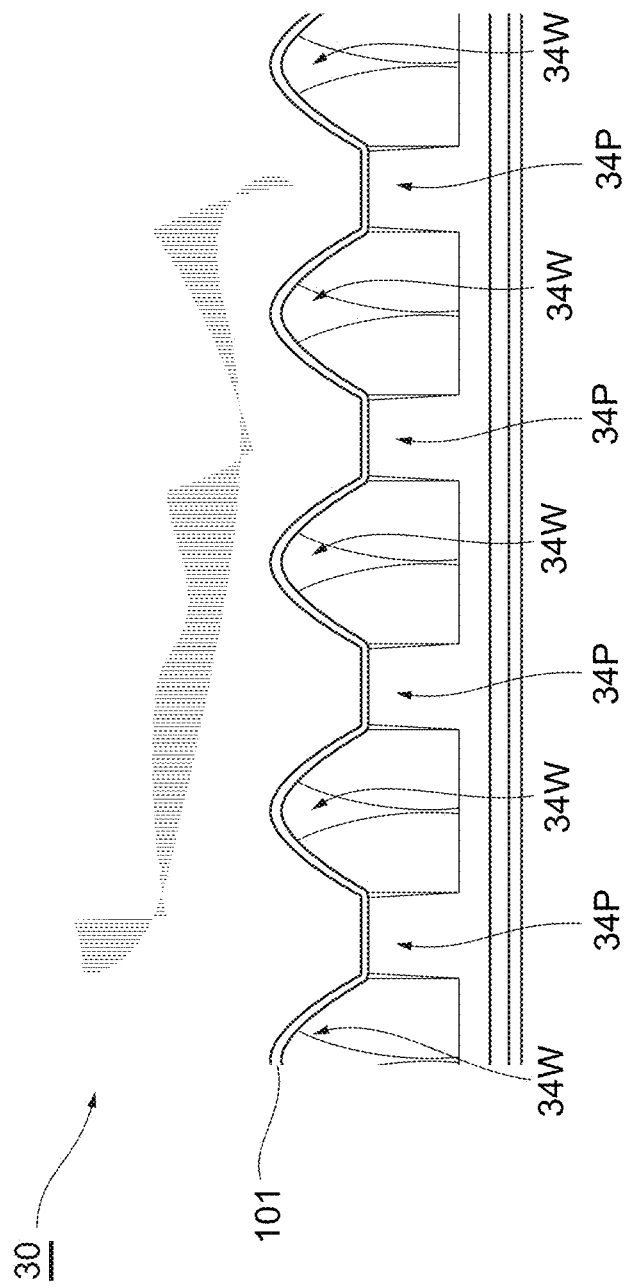
FIG. 20 is a perspective view schematically illustrating, at another angle, a state of the chips from the work which is cut by the wavy wall surface during the low-feed operation of the cutting insert.
Figure 27A:
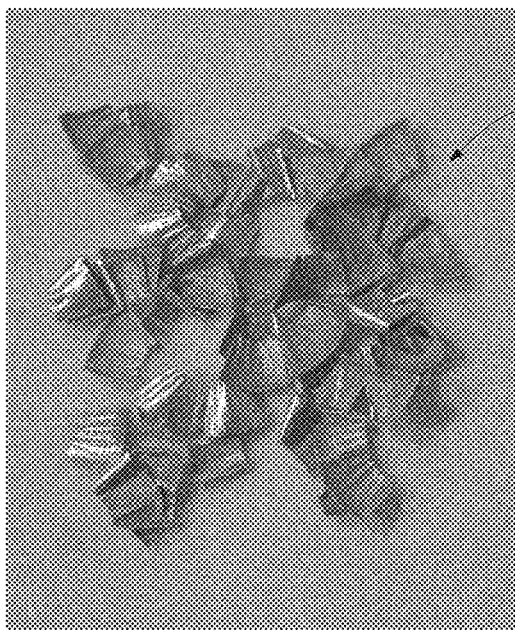
FIG. 27A illustrates an image of the chips from the work which is cut by the wavy wall surface during the low-feed operation of the cutting insert.
Figure 27B:
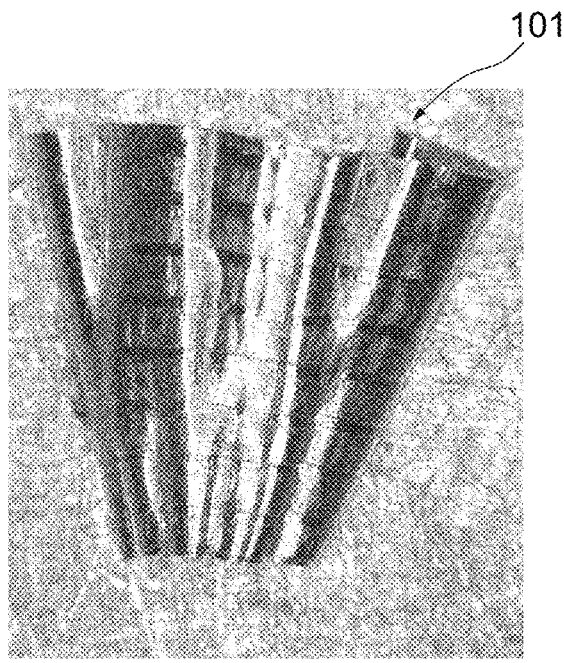
FIG. 27B illustrates an image obtained by enlarging a part of the image in FIG. 27A.

The relatively thin chips 101 are discharged along the wavy wall surface 34W. At this time, the wavy wall surface 34W gives a deformation to the chips 101 (cross sections thereof) (FIGS. 18 to 20). A force exerted by the wavy wall surface 34W allows the chips 101 to be easily cut (see FIGS. 27A and 27B). In addition, the chips 101 finely cut (into smaller pieces) (see FIG. 27A) do not get stuck on the cutting tool or the work, and thus the cutting insert 10 allows easy control (discharge) of chips during chip discharge.

The wavy wall surface 34W is configured such that the deepest wall portions (portions most distant from the side cutting edge 32) thereof are disposed parallel to the longitudinal direction x of the cutting edge body 30, not to the side cutting edge 32, to provide a structure in which portions of the wavy wall surface 34W closer to the front cutting edge 31 are more deeply recessed (see FIG. 14). This structure contributes to increasing the deformation given by the wavy wall surface 34W to the cross sections of the chips 101 as the wavy wall surface 34W is closer to the front cutting edge 31. Particularly during high depth cutting, different peripheral speeds of the portion of the wavy wall surface 34W closer to the front cutting edge 31 and the portion of the wavy wall surface 34W more distant from the front cutting edge 31 at the work 100 exert greater influence. However, a structure as described above reduces the influence exerted by the different peripheral speeds and allows, even at a portion of the work 100 closer to the rotation center line C and a portion of the work 100 more distant from the rotation center line C, the chips 101 to be equally controlled (cut), while inhibiting excessively uneven distribution of the cutting resistance. This achieves the effect of not giving an excessive deformation during the high depth cutting, while improving chip control during low depth cutting. In addition, the cutting insert 10 (the wavy wall surface 34W thereof) described above can improve the chip control particularly during finishing.

While the cutting insert 10 according to the embodiment of the present embodiment has been described heretofore, various changes can be made therein. For example, the cutting edge body 30 of the cutting insert 10 can be formed of an ultrahigh-pressure sintered body such as a diamond sintered body or a cubic boron nitride sintered body or of a material obtained by coating the hard material or the ultrahigh-pressure sintered body with a coating of any one selected from the group consisting of a carbide, a nitride, an oxide, a carbonitride, an oxycarbide, a carbon oxynitride, a boron nitride, and a boron carbon oxynitride of periodic table 4A, 5A, and 6A group metals, aluminum oxide, and titanium aluminum nitride or with an amorphous carbon thin film or the like by a CVD method, a PVD method, or the like.

Note that each of the embodiments described above is an example of preferred implementation of the present invention, but is not limited thereto. Various modifications can be made within a scope not departing from the gist of the present invention. For example, the shape of the wavy wall surface 34W shown in each of the embodiments described above is a mere preferred example, and a wavy wall surface having another shape, e.g., a shape including no arc (such as, e.g., a combinational shape of polygonal lines) can be used appropriately. The period of the wavy wall surface 34W may also be constant/uniform.

The cutting insert 10 described above in the present embodiment is preferred as a multifunctional insert of a back turning grooving tool type. However, in a strict sense, the cutting insert 10 can improve the chip control and the quality of the machined surface irrespective of the use and shape of a chip, and the use of the cutting insert 10 is not particularly limited.

The present invention is preferably applied to an insert for cutting.

What is claimed is:

1. A cutting insert comprising:
   a cutting edge body formed with a cutting edge,
   the cutting edge body having a prismatic shape having a longitudinal direction and a lateral direction perpendicular to the longitudinal direction and including:
   a front cutting edge formed on one end side of the cutting edge body in the longitudinal direction, the front cutting edge being the cutting edge formed on an intersecting edge between a peripheral side surface and an upper surface of the cutting edge body having the prismatic shape;
   a side cutting edge formed on one end side of the cutting edge body in the lateral direction;
   a first recessed part provided in the upper surface of the cutting edge body to be subsequent to the side cutting edge in the lateral direction; and
   a wall part having a wavy wall surface formed in the first recessed part and a discrete wall surface formed at a position between the wavy wall surface and the side cutting edge, the discrete wall surface including a plurality of surfaces which are separated from one another along the longitudinal direction, wherein
   the front cutting edge extends in a direction perpendicular to the longitudinal direction of the cutting edge body, and the first recessed part and a second recessed part are formed to be asymmetric with respect to a virtual perpendicular plane perpendicular to the front cutting edge and halving the front cutting edge.

2. The cutting insert according to claim 1, wherein the front cutting edge and the side cutting edge are connected via a corner cutting edge.

3. The cutting insert according to claim 1, wherein the wavy wall surface is formed to have a wavelength decreasing with increasing distance from the front cutting edge along the longitudinal direction.

4. The cutting insert according to claim 1, wherein each of the front cutting edge and the side cutting edge is connected to a rake surface having a positive rake angle in a cross section perpendicular to each of the cutting edges.

5. The cutting insert according to claim 4, wherein each of the front cutting edge and the side cutting edge is connected to the rake surface via a land part formed between each of the cutting edges and the rake surface.

6. The cutting insert according to claim 1, wherein each of the plurality of surfaces included in the discrete wall surface is provided as a wall surface forming an angle of not less than 90° with the upper surface in a virtual cross section along a plane perpendicular to the side cutting edge.

7. The cutting insert according to claim 1, wherein the wavy wall surface and the plurality of surfaces included in the discrete wall surface are configured to be connected in a top view of the cutting edge body.

8. The cutting insert according to claim 1, wherein a substrate to which the cutting edge body is to be joined has a projected part projecting more toward the upper direction than the upper surface of the cutting edge body.

9. A cutting insert comprising:
a cutting edge body formed with a cutting edge,
the cutting edge body having a prismatic shape having a longitudinal direction and a lateral direction perpendicular to the longitudinal direction and including:
a front cutting edge formed on one end side of the cutting edge body in the longitudinal direction, the front cutting edge being the cutting edge formed on an intersecting edge between a peripheral side surface and an upper surface of the cutting edge body having the prismatic shape;
a side cutting edge formed on one end side of the cutting edge body in the lateral direction;
a first recessed part provided in the upper surface of the cutting edge body to be subsequent to the side cutting edge in the lateral direction; and
a wall part having a wavy wall surface formed in the first recessed part and a discrete wall surface formed at a position between the wavy wall surface and the side cutting edge, the discrete wall surface including a plurality of surfaces which are separated from one another along the longitudinal direction,
wherein a substrate to which the cutting edge body is to be joined has a projected part projecting more toward the upper direction than the upper surface of the cutting edge body, and
the projected part is formed at a position distant by a predetermined value from a front surface of the substrate serving as one end thereof in the longitudinal direction.

10. The cutting insert according to claim 9, wherein the projected part has an inclined surface which is inclined with respect to the side cutting edge in a top view.

11. The cutting insert according to claim 1, wherein the cutting edge body is an ultrahigh-pressure sintered body to be joined to a substrate.

12. A cutting insert comprising:
a cutting edge body formed with a cutting edge,
the cutting edge body having a prismatic shape having a longitudinal direction and a lateral direction perpendicular to the longitudinal direction and including:
a front cutting edge formed on one end side of the cutting edge body in the longitudinal direction, the front cutting edge being the cutting edge formed on an intersecting edge between a peripheral side surface and an upper surface of the cutting edge body having the prismatic shape;
a side cutting edge formed on one end side of the cutting edge body in the lateral direction;
a first recessed part provided in the upper surface of the cutting edge body to be subsequent to the side cutting edge in the lateral direction; and
a wall part having a wavy wall surface formed in the first recessed part and a discrete wall surface formed at a position between the wavy wall surface and the side cutting edge, the discrete wall surface including a plurality of surfaces which are separated from one another along the longitudinal direction,
wherein an interval between adjacent surfaces of the plurality of surfaces of the discrete wall surface decreases with increasing distance from the front cutting edge along the longitudinal direction.

13. The cutting insert according to claim 9, wherein the side cutting edge is formed to extend to a position farther from the front surface than the position distant by the predetermined value from the front surface.

14. The cutting insert according to claim 10, wherein the inclined surface is formed to be closer to one end side in the lateral direction on which the side cutting edge is formed with increasing distance from the front surface.

15. The cutting insert according to claim 14, wherein the inclined surface is formed at an angle of 60° to 80° with respect to the lateral direction in a top view.

16. The cutting insert according to claim 10, wherein the inclined surface has an angle of 5° to 10° in a direction in which a distance to the front surface increases with increasing distance from the front surface.

17. The cutting insert according to claim 10, wherein the projected part is formed in a shape so as to be connected to any one surface at which the cutting edge body and the substrate are in contact with each other.

\* \* \* \* \*